(12) United States Patent
Kajiwara et al.

(10) Patent No.: US 8,913,473 B2
(45) Date of Patent: Dec. 16, 2014

(54) INFORMATION RECORDER, INFORMATION REPRODUCER, RECORDING MEDIA MANUFACTURING SYSTEM, AND INFORMATION RECORDING MEDIA, METHOD AND PROGRAM

(75) Inventors: Yoshiyuki Kajiwara, Kanagawa (JP); Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 243 days.

(21) Appl. No.: 13/393,646

(22) PCT Filed: Aug. 19, 2010

(86) PCT No.: PCT/JP2010/064030
§ 371 (c)(1),
(2), (4) Date: Mar. 1, 2012

(87) PCT Pub. No.: WO2011/030656
PCT Pub. Date: Mar. 17, 2011

(65) Prior Publication Data
US 2012/0170434 A1    Jul. 5, 2012

(30) Foreign Application Priority Data
Sep. 8, 2009   (JP) ................................. 2009-206661

(51) Int. Cl.
*G11B 20/10*   (2006.01)

(52) U.S. Cl.
USPC ................................. 369/59.24; 369/124.07

(58) Field of Classification Search
None
See application file for complete search history.

(56) References Cited

U.S. PATENT DOCUMENTS

| | | | | |
|---|---|---|---|---|
| 2004/0218491 A1* | 11/2004 | Sako et al. | ................. | 369/47.21 |
| 2005/0122889 A1 | 6/2005 | Kobayashi et al. | | |
| 2006/0072396 A1* | 4/2006 | Richter et al. | ............... | 369/47.1 |
| 2009/0274026 A1* | 11/2009 | Kadowaki et al. | ......... | 369/47.15 |
| 2010/0103790 A1* | 4/2010 | Kobayashi | ................ | 369/53.35 |

FOREIGN PATENT DOCUMENTS

| | | |
|---|---|---|
| JP | 2002-260239 A | 9/2002 |
| JP | 2004-213781 A | 7/2004 |

OTHER PUBLICATIONS

International Search Report issued Oct. 12, 2010 in PCT/JP2010/064030.

* cited by examiner

*Primary Examiner* — Paul Huber
(74) *Attorney, Agent, or Firm* — Sony Corporation

(57) ABSTRACT

The present invention provides an information recording configuration that achieves both difficulty in reading and highly accurate reading. Highly confidential additional information such as encryption key is recorded in a groove signal. During recording of the additional information, a groove signal is recorded that has an amplitude offset setting commensurate with the bit value. During reading of the additional information, a signal R0 with no offset is estimated from a signal R1 read from the groove signal for a predetermined period, after which a difference signal C=R1−R0 is calculated and integrated for each of the predetermined periods so as to determine the direction of the amplitude offset for each period. This process achieves recording and reproduction of additional information that offers enhanced difficulty in reading and highly accurate reading at the same time.

13 Claims, 14 Drawing Sheets

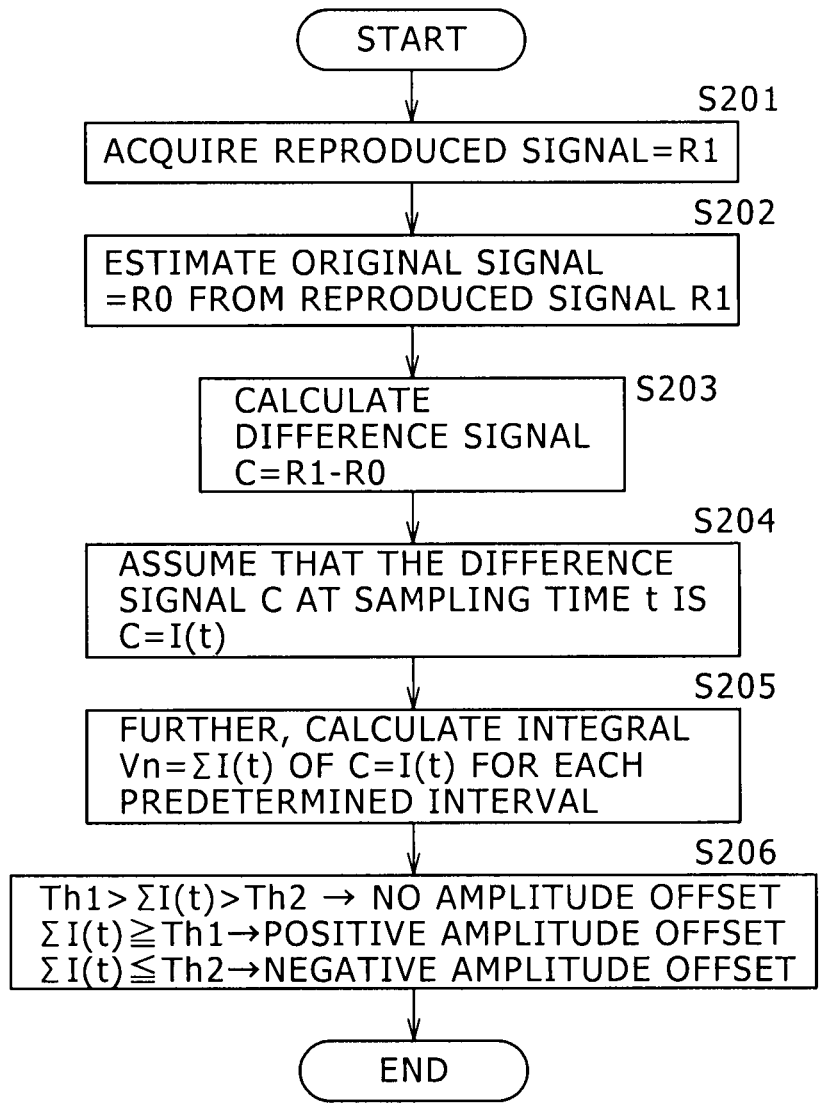

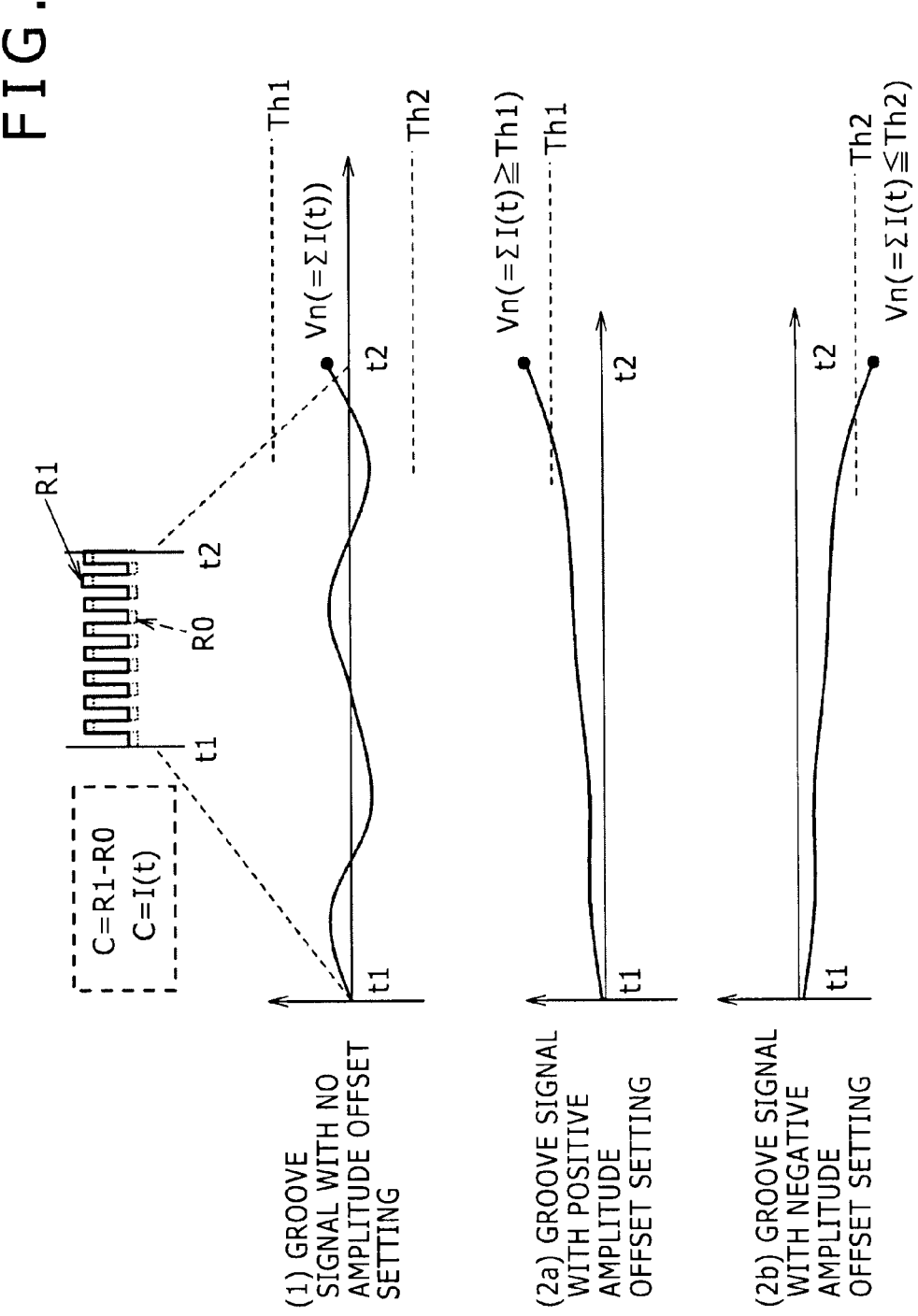

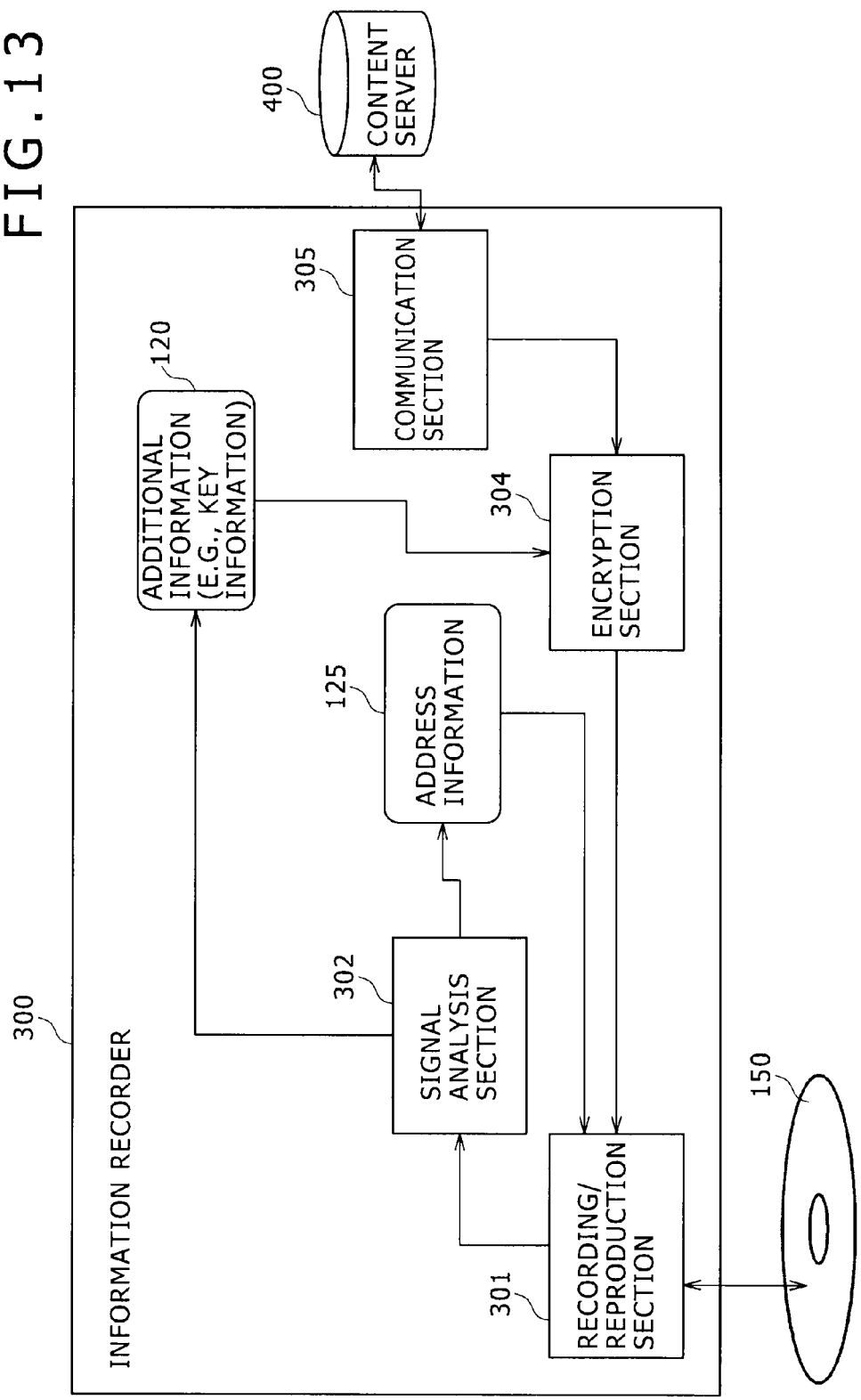

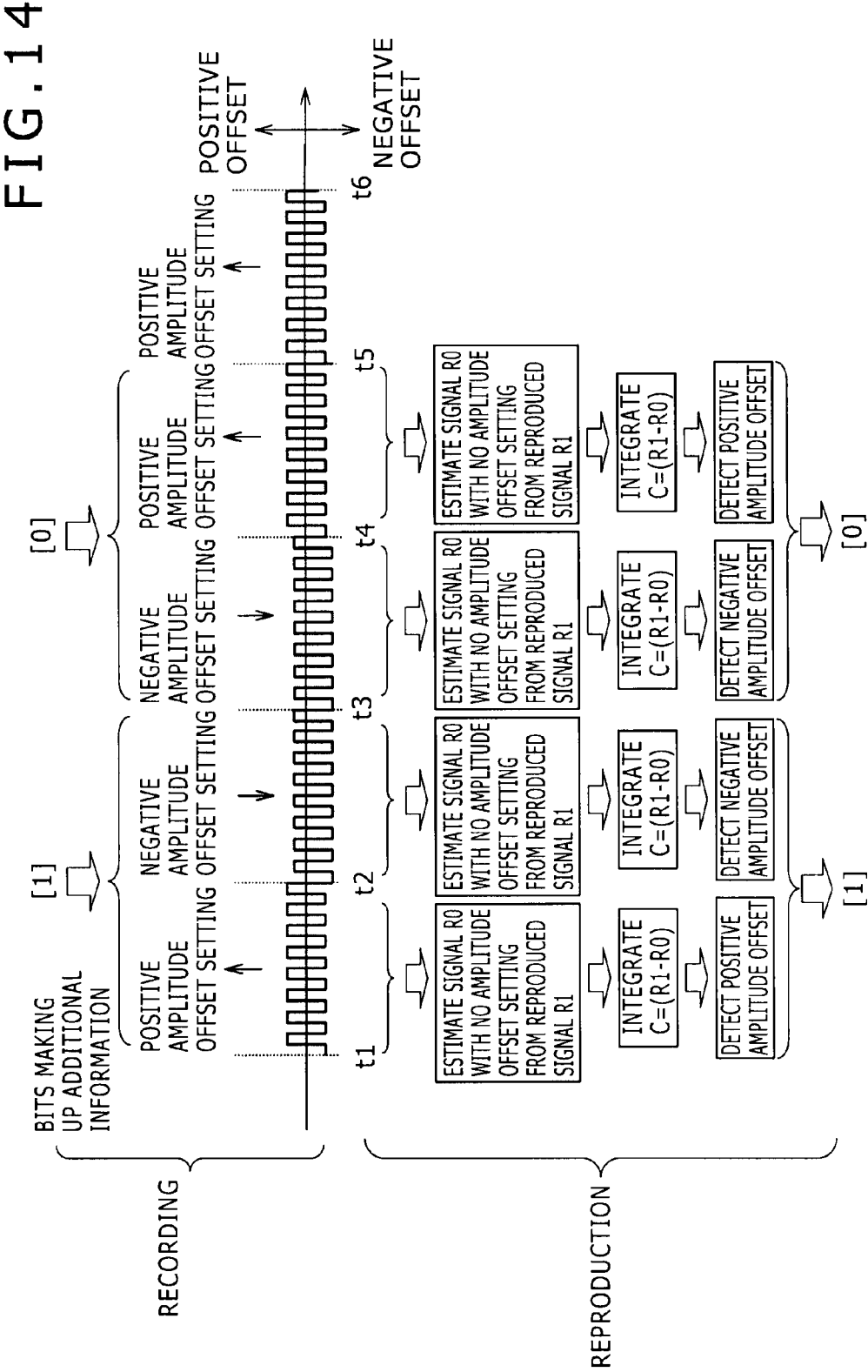

INFORMATION RECORDER, INFORMATION REPRODUCER, RECORDING MEDIA MANUFACTURING SYSTEM, AND INFORMATION RECORDING MEDIA, METHOD AND PROGRAM

TECHNICAL FIELD

The present invention relates to an information recorder, information reproducer, recording media manufacturing system, and information recording media, method and program. More specifically, the present invention relates to an information recorder, information reproducer, recording media manufacturing system, and information recording media, method and program for recording or reproducing a groove signal to be recorded as additional information such as recording conditions of a disc (information recording media) superimposed with additional information such as content key.

BACKGROUND ART

In optical discs, wobbling grooves are known to be used as additional information such as address information and recording conditions added to data recording tracks. For example, the pickup is placed at a desired track position using a wobbling groove so as to record data to the track or reproduce data therefrom.

On the other hand, illegal copying of content recorded on optical discs has recently become a problem. A sturdy contents protection system (CPS) designed to protect content is required.

Encryption of content to be stored on a disc is an approach to achieving a contents protection system (CPS). A configuration has been proposed that is designed to record, to the grooves, key information used to decrypt encrypted content and other content utilization control information in such a manner that these pieces of information are superimposed on address information. For example, Patent Document 1 (Japanese Patent Laid-Open No. 2004-213781) discloses a configuration designed to record key information to the grooves for use.

However, key information used to decrypt encrypted content and other content utilization control information is confidential and must be protected from easy reading to prevent leaks. On the other hand, if key data is recorded on a disc, it is necessary for the reproducer of a user having a legal content utilization right to accurately read the bits making up the key. The reason for this is that the decline in the bit reading accuracy makes it impossible to obtain accurate key information, thus making it impossible to decrypt the content.

For example, if key information used to decrypt content is recorded in the groove, it is necessary to meet two mutually contradictory requirements, i.e., avoiding easy reading and achieving accurate reading.

Among the requirements that must be met by a configuration adapted to record CPS data such as key information, i.e., data applied to a contents protection system (CPS), to a disc for use are as follows:
1. Highly reliable reproduced CPS data signal
2. Difficult to copy CPS data to other media
3. Not significantly high manufacturing costs of CPS data storage media and recording/reproduction drive Patent Document 1 (Japanese Patent Laid-Open No. 2004-213781) described above discloses a configuration adapted to record key information in the grooves for use. This prior art incorporates a novel idea to meet the above requirements. On the other hand, however, confidential information decryption techniques have also advanced. As a result, there are demands for a recording configuration offering an even higher degree of privacy.

PRIOR ART DOCUMENTS

Patent Documents

Patent Document 1: Japanese Patent Laid-Open No. 2004-213781

SUMMARY OF INVENTION

Technical Problem

The present invention has been made, for example, in light of the above problem, and it is an object of the present invention to provide an information recorder, information reproducer, recording media manufacturing system, and information recording media, method and program that can accurately read data while, at the same time, enhancing difficulty in reading additional information from a groove signal in a configuration adapted to record additional information such as encryption key for content recorded on a disc in the groove signal or reproduce the additional information therefrom.

Technical Solution

A first aspect of the present invention is a recording media manufacturing system including a recording signal generation section and recording section. The recording signal generation section generates a groove signal adapted to record additional information. The recording section records a recording signal, generated by the recording signal generation section, to a master disc. The recording signal generation section determines an amplitude offset setting according to the value of each of the bits making up the additional information. The recording signal generation section generates a recording signal having an amplitude offset setting commensurate with the value of each of the bits making up the additional information for each predetermined period of the recording signal.

Further, in an embodiment of the recording media manufacturing system according to the present invention, the recording signal generation section generates a recording signal having a different direction of the amplitude offset or different combination of directions thereof set in a groove signal according to whether the bit value of the additional information is '0' or '1.'

Further, in the embodiment of the recording media manufacturing system according to the present invention, the direction of the amplitude offset is either the inner or outer circumferential direction of the disc.

Still further, in the embodiment of the recording media manufacturing system according to the present invention, the additional information includes an encryption key used to encrypt content to be recorded to the disc or decrypt encrypted content recorded on the disc.

Further, a second aspect of the present invention is an information reproducer including a reproduction section and signal analysis section. The reproduction section reads a groove signal recorded on a disc. The signal analysis section analyzes a reproduced signal of the reproduction section. The signal analysis section determines the direction of an amplitude offset included in the groove signal for each predetermined signal period so as to determine, based on the determination result, the value of the bit making up the additional information included in the groove signal.

Still further, in an embodiment of the information reproducer according to the present invention, the signal analysis section estimates an original signal $R0$ with no offset from a reproduced signal $R1$ read from the groove signal. The signal analysis section integrates a difference signal $C=R1-R0$ representing the difference between the reproduced signal $R1$ and estimated original signal $R0$ for each of the predetermined signal periods and compares the integration result against preset thresholds to determine the direction of the amplitude offset setting for the predetermined signal period.

Still further, in the embodiment of the information reproducer according to the present invention, the information reproducer further includes a decryption section adapted to decrypt encrypted content recorded on the disc by using an encryption key included in the additional information analyzed by the signal analysis section.

Still further, a third aspect of the present invention is an information recorder including a reproduction section, signal analysis section, encryption section and recording section. The reproduction section reads a groove signal recorded on a disc. The signal analysis section determines the direction of an amplitude offset included in the groove signal read from the disc by the reproduction section for each predetermined signal period so as to analyze, through a bit value determination process based on the determination result, an encryption key included in the groove signal. The encryption section encrypts content by using the encryption key analyzed by the signal analysis section. The recording section records the encrypted content generated by the encryption section to the disc.

Further, in an embodiment of the information recorder according to the present invention, the signal analysis section estimates an original signal $R0$ with no offset from a reproduced signal $R1$ read from the groove signal. The signal analysis section integrates a difference signal $C=R1-R0$ representing the difference between the reproduced signal $R1$ and estimated original signal $R0$ for each of the predetermined signal periods and compares the integration result against preset thresholds to determine the direction of the amplitude offset setting for the predetermined signal period.

Still further, a fourth aspect of the present invention is an information recording media adapted to record a groove signal used to record additional information. The groove signal is recorded as a signal having a different amplitude offset setting commensurate with the value of the bit making up the additional information for a predetermined signal period. The additional information can be read by a reproducer based on the detection of the amplitude offset setting.

Further, in an embodiment of the information recording media according to the present invention, the groove signal is a signal having a different direction of the amplitude offset or combination of directions thereof set therein according to whether the bit value of the additional information is '0' or '1.'

Still further, in the embodiment of the information recording media according to the present invention, the additional information includes an encryption key used to encrypt content to be recorded to the disc or decrypt encrypted content recorded on the disc.

Still further, a fifth aspect of the present invention is an information recording media manufacturing method carried out by a recording media manufacturing system that includes a recording signal generation step and recording step. In the recording signal generation step, a recording signal generation section generates a groove signal adapted to record additional information. In the recording step, a recording section records a recording signal, generated in the recording signal generation step, to a master disc. The recording signal generation step includes a step of determining an amplitude offset setting according to the value of each of the bits making up the additional information and generating a recording signal having an amplitude offset setting commensurate with the value of each of the bits making up the additional information for each predetermined period of the recording signal.

Still further, a sixth aspect of the present invention is an information reproduction method carried out by an information reproducer that includes a reproduction step and signal analysis step. In the reproduction step, a reproduction section reads a groove signal recorded on a disc. In the signal analysis step, a signal analysis section analyzes a reproduced signal generated in the reproduction step. The signal analysis step includes a step of determining the direction of an amplitude offset included in the groove signal for each predetermined signal period so as to determine, based on the determination result, the value of the bit making up additional information included in the groove signal.

Still further, a seventh aspect of the present invention is an information recording method carried out by an information recorder that includes a reproduction step, signal analysis step, encryption step and recording step. In the reproduction step, a reproduction section reads a groove signal recorded on a disc. In the signal analysis step, a signal analysis section determines the direction of an amplitude offset included in the groove signal read from the disc in the reproduction step for each predetermined signal period so as to analyze, through a bit value determination process based on the determination result, information of bits making up an encryption key included in the groove signal. In the encryption step, an encryption section encrypts content by using the encryption key analyzed in the signal analysis step. In the recording step, a recording section records the encrypted content generated in the encryption step to the disc.

Still further, an eighth aspect of the present invention is a program for causing information reproduction to be carried out by an information reproducer that includes a reproduction step and signal analysis step. The reproduction step causes a reproduction section to read a groove signal recorded on a disc. The signal analysis step causes a signal analysis section to analyze a reproduced signal generated in the reproduction step. The signal analysis step includes a step of causing the direction of an amplitude offset included in the groove signal to be determined for each predetermined signal period so as to determine, based on the determination result, the value of the bit making up additional information included in the groove signal.

Still further, a ninth aspect of the present invention is a program for causing information recording to be carried out by an information recorder that includes a reproduction step, signal analysis step, encryption step and recording step. The reproduction step causes a reproduction section to read a groove signal recorded on a disc. The signal analysis step causes a signal analysis section to determine the direction of an amplitude offset included in the groove signal read from the disc in the reproduction step for each predetermined signal period so as to analyze, through a bit value determination process based on the determination result, information of bits making up an encryption key superimposed and recorded in the groove signal. The encryption step causes an encryption section to encrypt content by using the encryption key analyzed in the signal analysis step. The recording step causes a recording section to record the encrypted content generated in the encryption step to the disc.

It should be noted that the program according to the present invention is, for example, a program that can be supplied via a recording media or communication media supplied in a computer-readable format to an image processor or computer system capable of executing a variety of program codes. Supplying such a program in a computer-readable format makes it possible to perform the processes related to the program in the image processor or computer system.

Still other objects and features of the present invention will become apparent from the following detailed description based on the embodiment of the present invention which will be described later and the accompanying drawings. It should be noted that the term "system" in the present specification refers to a logical collection of a plurality of devices, and that the constituent devices are not necessarily provided in the same enclosure.

Advantageous Effect

An embodiment of the present invention makes possible an information recording configuration that achieves both difficulty in reading and highly accurate reading. For example, highly confidential additional information such as encryption key is recorded in a groove signal. During recording of the additional information, a groove signal is recorded that has an amplitude offset setting commensurate with the value of the bit making up the additional information. During reading of the additional information, the signal R0 with no offset is estimated from the signal R1 read from the groove signal for a predetermined period, after which the difference signal C=R1−R0 is calculated and integrated for each of the predetermined periods so as to determine the direction of the amplitude offset of the groove signal for each period. This process achieves recording and reproduction of additional information that offers enhanced difficulty in reading and highly accurate reading at the same time.

BRIEF DESCRIPTION OF DRAWINGS

FIG. 11 is a diagram illustrating a flowchart describing a sequence for determining the value of an additional information bit from a groove signal performed by the information reproducer according to the embodiment of the present invention.

FIG. 12 shows diagrams describing examples of acquisition of additional information by analysis of a groove signal performed by the information reproducer according to the embodiment of the present invention.

FIG. 13 is a diagram describing a configuration example of an information recorder according to the embodiment of the present invention.

FIG. 14 is a diagram describing examples of recording and reproduction of a groove signal having an amplitude offset setting according to the embodiment of the present invention.

MODE FOR CARRYING OUT THE INVENTION

A detailed description will be given below of an information recorder, information reproducer, recording media manufacturing system, and information recording media, method and program according to the present invention with reference to the accompanying drawings. The description will be given under the following headings:
1. Configuration of and process performed by the recording media manufacturing system and the information recording media
2. Configuration of and process performed by the information reproducer
3. Configuration of and process performed by the information recorder
4. Other embodiments 1. Configuration of and Process Performed by the Recording Media Manufacturing System and the Information Recording Media A description will be given first of the configuration of and process performed by a recording media manufacturing system according to an embodiment of the present invention with reference to FIG. 1 onwards.

Figure 1:
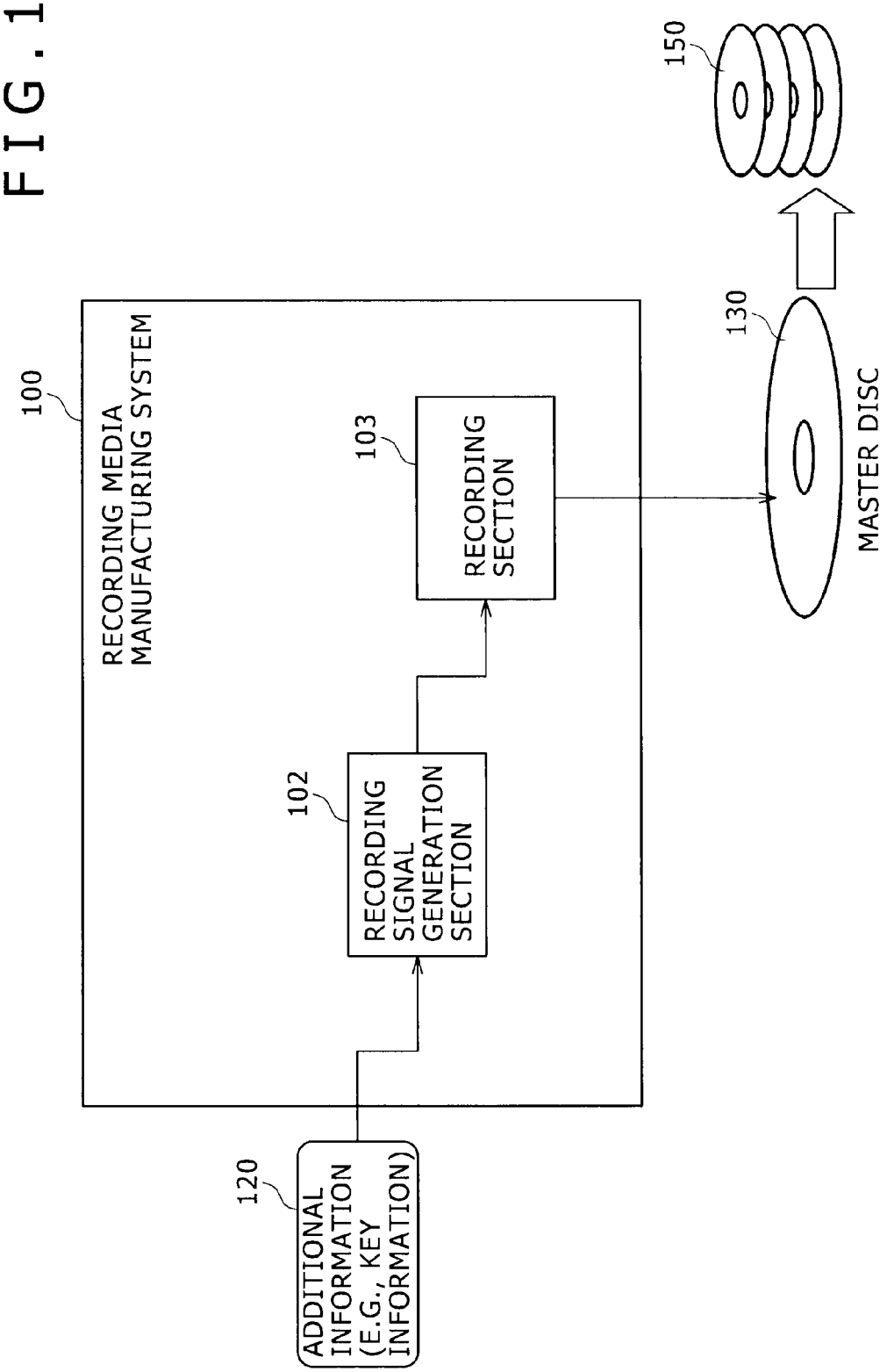
FIG. 1 is a diagram describing a configuration example of a recording media manufacturing system according to an embodiment of the present invention.

FIG. 1 is a block diagram illustrating the configuration of a recording media manufacturing system according to an embodiment of the present invention. A recording media manufacturing system 100 manufactures a master disc 130, i.e., an original master. Then, the master disc 130 is stamped for volume production of discs 150, i.e., information recording media, to be supplied to users.

The master disc 130 records a groove signal used to record additional information such as recording conditions. A groove signal includes wobbling grooves.

As illustrated in FIG. 1, the recording media manufacturing system 100 generates a recording signal when additional information 120 such as recording conditions, i.e., additional information 120 such as encryption key, is entered into the same system 100. The additional information 120 includes, for example, encryption key. A groove signal is recorded to the master disc 130 in accordance with the generated recording signal.

The additional information 120 is data containing, for example, 64 or 128 bits making up the encryption key. The additional information 120 is entered into a recoding signal generation section 102.

The recoding signal generation section 102 generates a recording signal (groove signal) adapted to record the additional information 120 such as recording conditions to the master disc 130 by entering the same information 120. The recoding signal generation section 102 generates a wobbling groove signal indicating additional information such as recording conditions through FM (frequency modulation) or HFM (high-frequency modulation). It should be noted that we assume that FM (frequency modulation) includes HFM (high-frequency modulation) in the description given below.

For example, first additional information such as recording conditions is recorded using a groove signal. Further, second additional information such as encryption key to be superimposed and recorded is recorded by setting an amplitude offset (shift) in the groove signal (FM modulated signal). The term "offset setting" refers to a shift of the groove signal in the inner or outer circumferential direction of the disc, i.e., in the radial direction of the disc. This process will be described in detail later.

It should be noted that recording of the additional information 120 using a groove signal can be carried out in any of the following manners:
A. Record only first additional information in a groove signal with no offset setting
B. Record only first additional information in a groove signal with no offset setting and record second additional information in a manner superimposed on the first additional information by setting an offset in the groove signal
C. Do not record any information in a groove signal with no offset and record only first additional information by setting an offset It should be noted that among additional information are disc information, conditions for recording content to a disc, reproduction conditions, recording/reproduction control information and encryption key used to encrypt content to be recorded to a disc and decrypt encrypted content recorded on the disc. These pieces of additional information can be recorded alone or superimposed one on the other according to one of the forms of recording classified as A to C.

The recording signal generated by the recoding signal generation section 102 is output to a recording section 103. The recording section 103 forms grooves commensurate with the recording signal on the master disc 130 using a laser output. Groove signals recorded on the master disc 130 are spiral grooves running along the data tracks to which content is recorded and those running in the inner circumferential area of the disc where no data tracks are formed. At least some of these groove signals each have an amplitude offset in which additional information such as encryption key is recorded.

In the embodiment described below, an example will be described in which first additional information such as recording conditions is recorded as a groove signal with no offset, and an encryption key, i.e., second additional information, is further recorded by setting an amplitude offset in the groove signal. It should be noted that only the encryption key may be recorded by setting an amplitude offset in the groove signal without recording additional information with no offset to the groove signal.

Thanks to recording by the recording section 103 shown in FIG. 1, the master disc 130 is manufactured that has a groove signal in which an encryption key, i.e., additional information, is recorded as a result of setting of an amplitude offset in the groove signal. The master disc 130 is stamped, thus producing a large number of the discs 150 to be supplied to users.

It should be noted that the discs 150 may be those on which content such as movies is recorded or those with no recorded content. The discs with no recorded content are user-writable. A user who has purchased the disc 150 with no recorded content can record content such as movies to the disc 150 later.

For example, a user who has purchased the disc with no recorded content connects to a content providing server via a network using the recorder/reproducer of his or her PC. The server supplies decryptable encrypted content using the encryption key recorded on the disc 150.

A user device records the content that has been downloaded from the server to the disc 150. Then, during reproduction of the content, it is possible to read the encryption key from the groove signal recorded on the disc 150 and then decrypt the encrypted content recorded on the disc 150 using the read encryption key so as to reproduce the content.

Alternatively, it is possible to acquire unencrypted content from the server and then encrypt the acquired content using the encryption key read from the groove signal by the user device so as to record the acquired content to a disc.

In either case, encrypted content and the encryption key used to decrypt the encrypted content are stored together on a single disc. Therefore, even if, for example, the encrypted content is output and copied to other media, it is possible to effectively prevent unauthorized use of the content because the encryption key cannot be used.

A detailed description will be given next of the configuration of and process performed by the recoding signal generation section 102 of the recording media manufacturing system 100 with reference to FIG. 2. As described earlier, the recoding signal generation section 102 generates a recording signal including additional information such as encryption key and recording/reproduction conditions.

Figure 2:
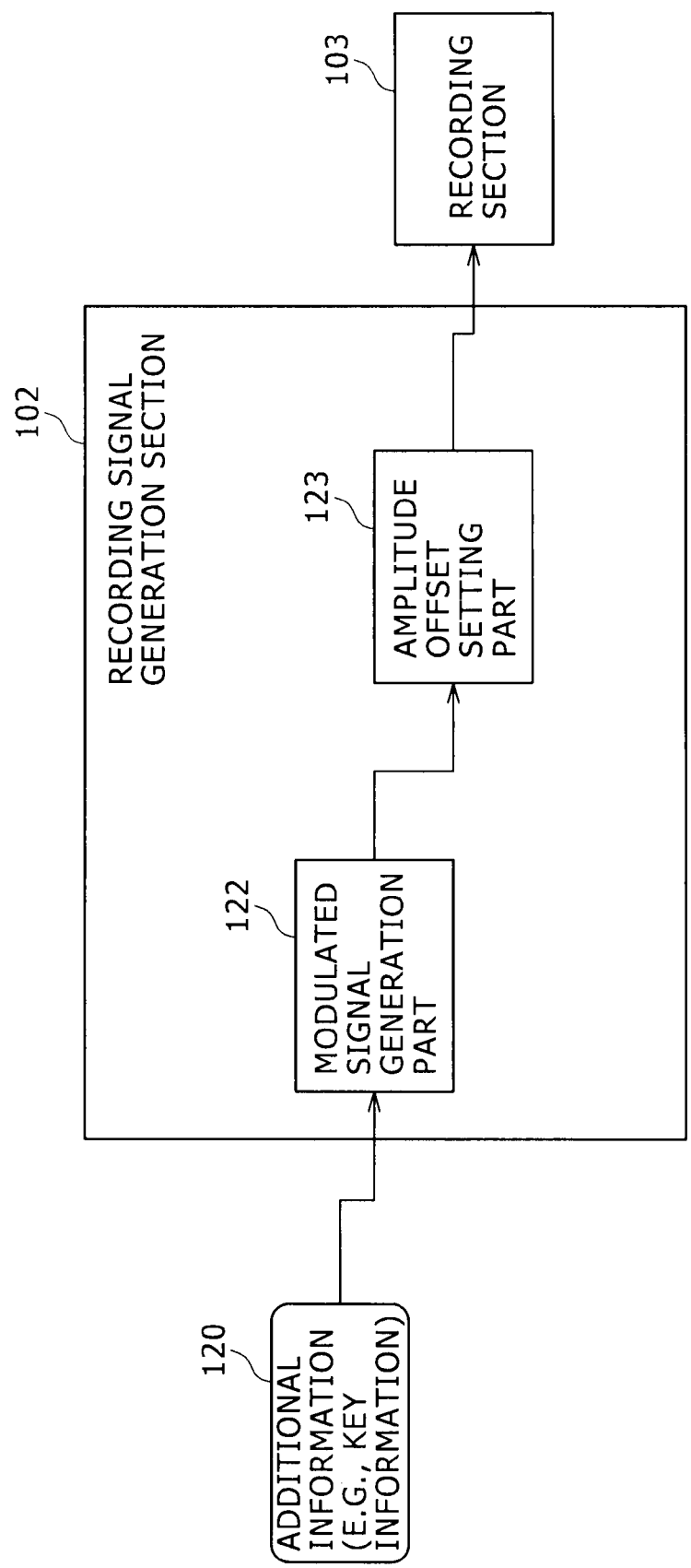
FIG. 2 is a diagram describing a configuration example of a recording signal generation section of the recording media manufacturing system according to the embodiment of the present invention.

The recoding signal generation section 102 includes a modulated signal generation part 122 and amplitude offset setting part 123 as illustrated in FIG. 2.

The recoding signal generation section 102 generates a groove signal having an amplitude offset setting commensurate with the value of the bit (0 or 1) making up additional information. The term "offset setting" refers, as described earlier, to a shift of the groove signal in the inner or outer circumferential direction of the disc, i.e., in the radial direction of the disc.

For example, if the value of the bit making up additional information is '1,' a groove signal whose amplitude has been offset (shifted) in the inner circumferential direction of the disc (in the positive direction) is generated and recorded. On the other hand, if the value of the bit making up additional information is '0,' a groove signal whose amplitude has been offset (shifted) in the outer circumferential direction of the disc (in the negative direction) is generated and recorded. That is, a signal is generated which has an amplitude offset in a different direction commensurate with the bit making up additional information.

It should be noted that various offset settings are possible. For example, settings opposite to the above or those described below are also possible.

If the bit is '1,' a preceding groove signal having a positive amplitude offset is combined with a groove signal having a negative amplitude offset.

If the bit is '0,' a preceding groove signal having a negative amplitude offset is combined with a groove signal having a positive amplitude offset.

A still another possible offset includes a combination of a groove signal with no offset and a groove signal with an offset.

It should be noted that although the inner circumferential direction will be described below as a positive direction and the outer circumferential direction as a negative direction in terms of the direction of an offset, this means that these positive and negative directions of an offset are opposite in direction. This does not restrict the association of the inner or outer circumferential direction therewith. Conversely to the above, the inner circumferential direction may be a negative direction, and the outer circumferential direction a positive direction.

The modulated signal generation part 122 generates a modulated signal that has undergone FM modulation according to first additional information such as recording conditions. The signal generated here corresponds to a groove signal with no offset and includes only first additional information.

Next, the amplitude offset setting part 123 generates a recording signal having an amplitude offset setting in a different direction commensurate with the bit making up the encryption key, i.e., second additional information, from the modulated signal generated by the modulated signal generation part 122. That is, the same part 123 generates a groove signal having the second additional information superimposed on the first additional information.

Figure 3:
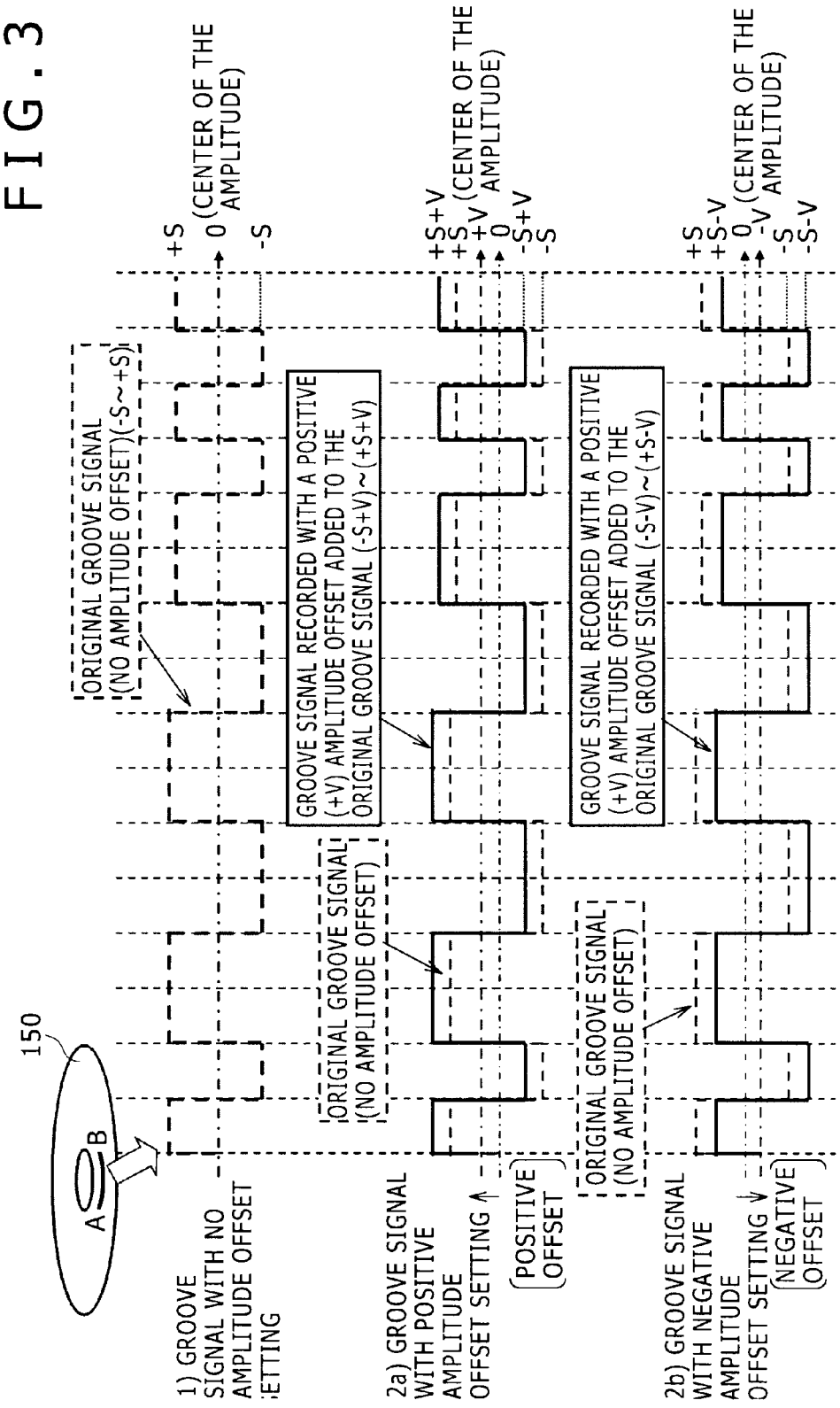
FIG. 3 shows diagrams describing examples of groove signals having an amplitude offset setting according to the embodiment of the present invention.

FIG. 3 illustrates examples of groove signals recorded to the master disc and discs 150. A groove signal is recorded as a spirally running groove cut on the disc 150. FIGS. 3(1), 3(2a) and 3(2b) illustrate detailed configuration examples of part thereof. That is, FIG. 3 illustrates examples of groove signals in an area AB of the disc 150 shown in these figures.

FIG. 3 illustrates examples of the following signals:
(1) Groove signal with no amplitude offset setting
(2a) Groove signal with a positive amplitude offset
(2b) Groove signal with a positive amplitude offset It should be noted that the data shown in FIGS. 3(1), 3(2a) and 3(2b) corresponds to the groove signals recorded on the disc surface, and that the rightward direction is the track signal direction. FIG. 3(1) illustrates a groove signal with no amplitude offset setting. In FIGS. 3(2a) and 3(2b), this groove signal with no amplitude offset setting is shown by a dashed line.

The solid lines shown in FIGS. 3(2a) and 3(2b) represent the groove signals with an amplitude offset.

In the example shown in FIG. 3(2a), the groove signal shown by a solid line and having a positive amplitude offset is shifted slightly upward (positive direction) relative to the groove signal (with no amplitude offset) shown by a dashed line. This shift represents the positive amplitude offset. The upward direction corresponds to the inner circumferential direction of the disc (positive direction) in the present example.

In the example shown in FIG. 3(2b), the groove signal shown by a solid line and having a negative amplitude offset is shifted slightly downward (negative direction) relative to the groove signal (with no amplitude offset) shown by a dashed line. This shift represents the negative amplitude offset. The downward direction corresponds to the outer circumferential direction of the disc (negative direction) in the present example.

As described earlier, each of the groove signals shown in FIG. 3 corresponds to a view as seen above the disc. For example, the groove signal having a positive amplitude offset illustrated in FIG. 3(2a) shows that the groove signal as a whole is formed in such a manner that the signal is shifted toward the inner circumferential side of the disc. The groove signal having a negative amplitude offset illustrated in FIG. 3(2b) shows that the groove signal as a whole is formed in such a manner that the signal is shifted toward the outer circumferential side of the disc.

A groove signal recorded to the master disc and other discs includes a mixture of different types of groove signals, namely, those shown in FIGS. 3(1), 3(2a) and 3(2b). Groove signals having different directions of amplitude offsets are recorded according to the bit making up additional information such as key information. It should be noted that such an amplitude offset can be set by adjusting the DC level of the recording signal generated during recording of a groove signal.

For example, the groove signal with no amplitude offset shown in FIG. 3(1) is recorded by varying the potential in the range from −S to +S during generation of the groove signal as illustrated in the same figure.

In contrast, the groove signal having a positive amplitude offset shown in FIG. 3(2a) need only be recorded by varying the potential in the range from (−S+V) to (+S+V) during generation of the groove signal.

The groove signal having a negative amplitude offset shown in FIG. 3(2b) is recorded by varying the potential in the range from (−S−V) to (+S−V) during generation of the groove signal.

The amplitude offset setting part 123 shown in FIG. 2 generates these recording signals, switching from one of a groove signal having a positive amplitude offset, a groove signal having a negative amplitude offset and a groove signal with no amplitude offset over to another every predetermined signal period whenever necessary for recording.

It should be noted that we assume that the percentage of an amplitude offset set in a groove signal is very slight. For example, the offsets (+V) and (−V) set to the amplitude (S) of a groove signal with no amplitude offset shown in FIG. 3(1) are 1 to 5% or so of the amplitude (S).

The groove signal with no amplitude offset shown in FIG. 3(1) is an FM modulated signal having an amplitude ranging from −S to +S. In the disc according to the present invention, groove signals having different settings, namely, those shown in FIGS. 3(1), 3(2a) and 3(2b), are mixed. As a result, FM modulated signals having an amplitude ranging from (−S−V) to (+S+V) are recorded.

The reproducer detects, during reading of a groove signal, the amplitude offset from the groove signal so as to analyze the value of the bit making up additional information based on the detected amplitude offset. The reproducer estimates the original signal [R0] with no offset, for example, from the reproduced signal [R1] read from the groove signal and then calculates the difference signal C, i.e., C=R1−R0.

The reproducer accumulates (integrates) the value of the calculated difference signal C for a constant period. The reproducer detects the amplitude offset of the groove signal based on the integration. A description will be given of a specific example of an amplitude offset setting and an example of association with bit data making up additional information with reference to FIG. 4.

Figure 4:
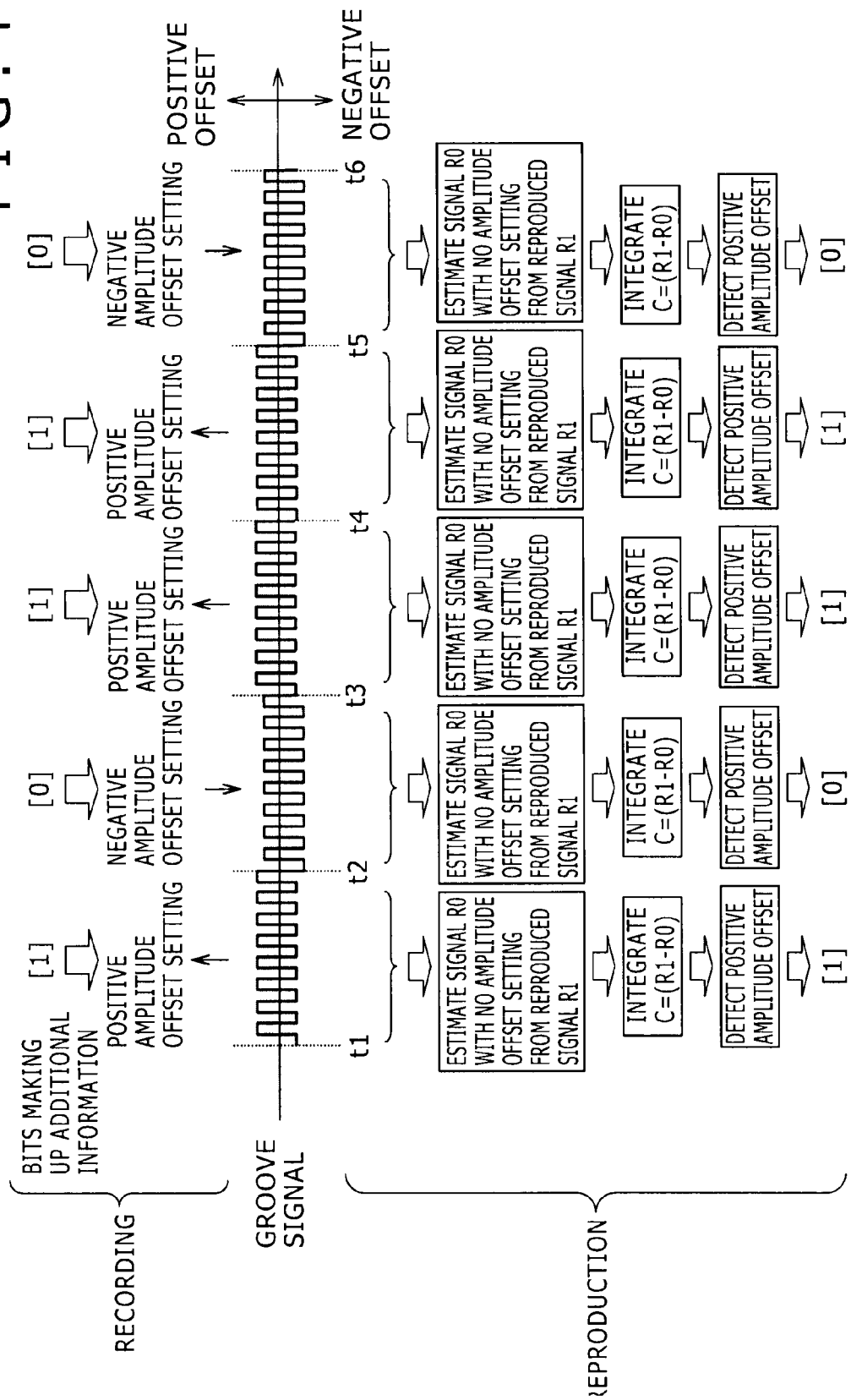
FIG. 4 is a diagram describing examples of recording and reproduction of a groove signal having an amplitude offset setting according to the embodiment of the present invention.

FIG. 4 is a diagram illustrating examples of recording and reproduction of a groove signal. In the examples shown in FIG. 4, the direction of an offset setting is changed according to whether the value of the bit making up additional information such as encryption key is '0' or '1.' That is, examples are shown in which a groove signal is recorded with either of the following settings:

When the bit is '1,' the groove signal has a positive amplitude offset setting.

When the bit is '0,' the groove signal has a negative amplitude offset setting.

During recording of a groove signal, when the bit making up additional information is '1,' a groove signal having a positive amplitude offset is recorded for a predetermined period. When the bit making up additional information is '1,' a groove signal having a negative amplitude offset is recorded for a predetermined period.

FIG. 4 illustrates examples in which groove signals having the following settings are generated and recorded:

t1 to t2: Groove signal having a positive amplitude offset setting (associated with the bit value of 1)

t2 to t3: Groove signal having a negative amplitude offset setting (associated with the bit value of 0)

t3 to t4: Groove signal having a positive amplitude offset setting (associated with the bit value of 1)

t4 to t5: Groove signal having a positive amplitude offset setting (associated with the bit value of 1)

t5 to t6: Groove signal having a negative amplitude offset setting (associated with the bit value of 0)

It should be noted that the percentage of an amplitude offset set in a groove signal is very slight. For example, the offsets (+V) and (−V) set to the amplitude (S) of a groove signal with no amplitude offset shown in FIG. 3(1) are 1 to 5% or so of the amplitude (S). It is, therefore, difficult to determine, by reading only once, whether the amplitude offset setting is positive or negative.

During recording of a groove signal, when the value of the bit making up additional information is '1,' for example, a groove signal having a positive amplitude offset is set and recorded for a predetermined period. On the other hand, when the value of the bit making up additional information is '0,' a groove signal having a negative amplitude offset is set and recorded for a predetermined period.

The reproducer reads the groove signal at intervals of a constant sampling time (T), estimating the original signal [R0] with no offset setting from the reproduced signal [R1] read at each sampling time. A detailed description will be given of this process later.

Further, the reproducer calculates the difference signal C, i.e., C=R1−R0, representing the difference between the reproduced signal [R1] read at each sampling time and the original signal [R0] with no offset setting obtained from the above estimation.

The reproducer accumulates (integrates) the value of the calculated difference signal C for each constant period (e.g., t1 to t2). This integration is used to determine the direction (positive or negative) of the amplitude offset of the groove signal read for each constant period (e.g., t1 to t2). A description will be given of this process later.

It should be noted that the control timings of both the recorder and reproducer are set by a clock set in each of the recorder and reproducer so that the determination can be made based on a preset number of clocks for the periods shown in FIG. 4 such as the period from t1 to t2.

As described with reference to FIG. 3, the following signals having three different patterns are recorded:
(1) Groove signal with no amplitude offset setting
(2a) Groove signal with a positive amplitude offset setting
(2b) Groove signal with a negative amplitude offset setting A groove signal having one of the above three setting patterns (1), (2a), and (2b) is recorded, for example, for a constant period such as the period from t1 to t2 or from t2 to t3 shown in FIG. 4.

The reproducer analyzes the amplitude offset for a constant period such as the period from t1 to t2 or from t2 to t3 shown in FIG. 4. This analysis makes it possible to generate different amplitude offset accumulation signals (integration signals) associated with the above three patterns. Accumulating the amplitude offsets as described above, that is, integrating the detection signals, allows for error-free detection of whether the amplitude offset is positive or negative.

This process is shown at the bottom in FIG. 4. For example, the reproducer estimates, for a constant period such as the period from t1 to t2 or from t2 to t3 shown in FIG. 4, the original signal [R0] with no offset setting from the reproduced signal [R1] read at each sampling time.

Next, the reproducer calculates the difference signal C, i.e., C=R1−R0, representing the difference between the reproduced signal [R1] and the estimated original signal [R0].

Further, the reproducer accumulates (integrates) the value of the calculated difference signal C for each constant period (e.g., t1 to t2). The reproducer determines whether this accumulation result is shifted positively or negatively by a predetermined threshold or more, thus determining the offset direction.

More specifically, the process example shown at the bottom in FIG. 4 represents a process example as described below.

t1 to t2: The original signal [R0] with no offset setting is estimated from the reproduced signal R1, i.e., the read groove signal, thus calculating the difference signal C=R1−R0 representing the difference therebetween. The calculated difference signal C is accumulated (integrated), thus determining that a positive amplitude offset is set in this period. As a result, the bit value is determined to be '1.' t2 to t3: The original signal [R0] with no offset setting is estimated from the reproduced signal R1, i.e., the read groove signal, thus calculating the difference signal C=R1−R0 representing the difference therebetween. The calculated difference signal C is accumulated (integrated), thus determining that a negative amplitude offset is set in this period. As a result, the bit value is determined to be '0.'

The same process is performed from here onwards to obtain the bit values one after another.

Continuing this process makes it possible to obtain all the values of the bits making up, for example, a 64-bit or 128-bit key.

2. Configuration of and Process Performed by the Information Reproducer

A description will be given next of an example of configuration and process performed by a reproducer adapted to reproduce a disc on which a groove signal superimposed with the above additional information is recorded.

Figure 5:
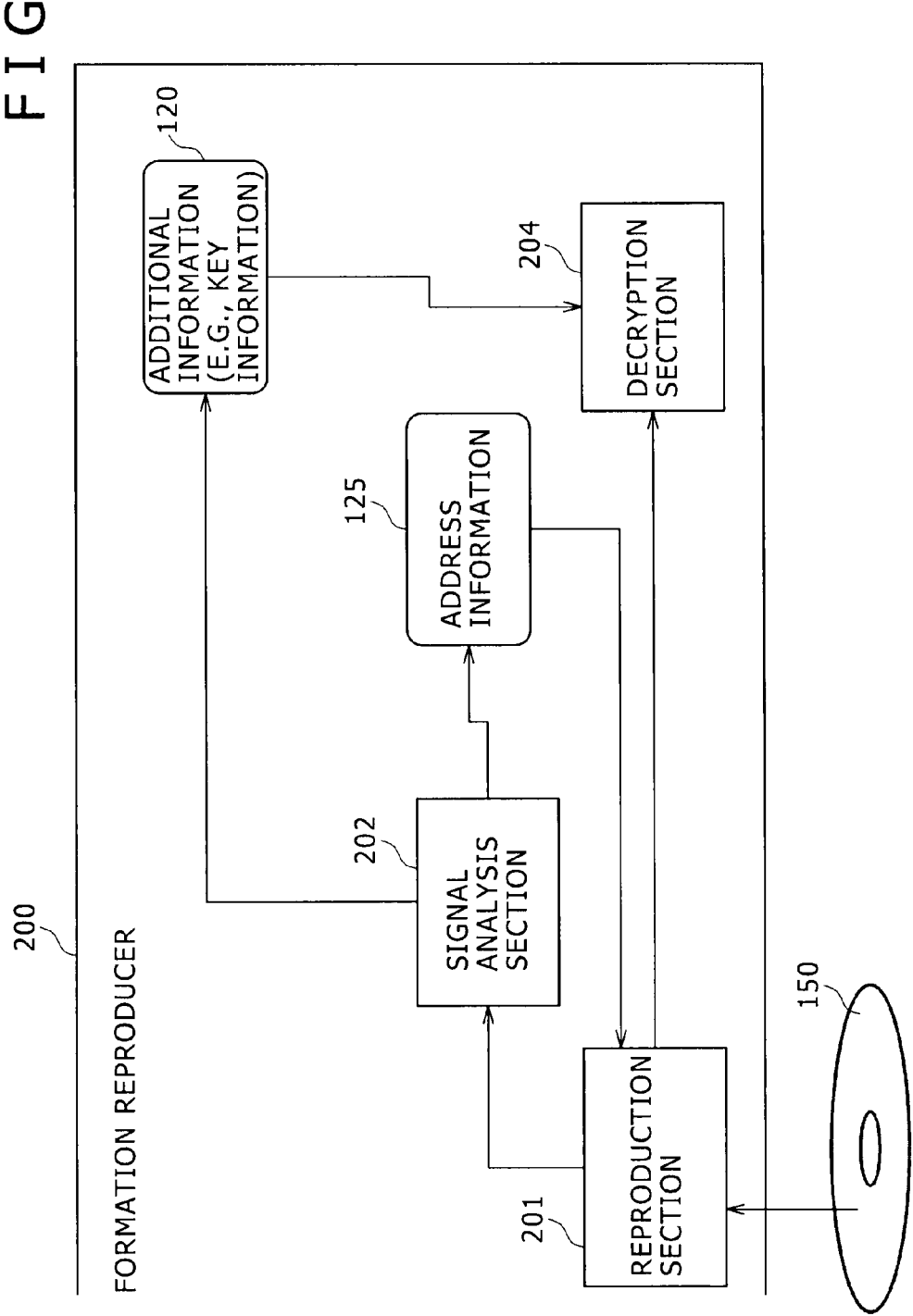
FIG. 5 is a diagram describing a configuration example of an information reproducer according to the embodiment of the present invention.

FIG. 5 is a block diagram illustrating a configuration example of an information reproducer according to the embodiment of the present invention. An information reproducer 200 includes a reproduction section 201, signal analysis section 202 and decryption section 204 as illustrated in FIG. 5.

The reproduction section 201 reads a signal from the disc 150. A groove signal superimposed with additional information such as encryption key described earlier is recorded on the disc 150. Further, encrypted content that has been encrypted with the encryption key is also recorded on the same disc 150.

The reproduction section 201 reads the groove signal and outputs the same signal to the signal analysis section 202. As described with reference to FIG. 3 and so on, a groove signal includes a mixture of the following signals in three different patterns:

(1) Groove signal with no amplitude offset setting
(2a) Groove signal with a positive amplitude offset setting
(2b) Groove signal with a negative amplitude offset setting The signal analysis section 202 demodulates and analyzes the groove signal fed from the reproduction section 201, thus detecting the amplitude offset and detecting, based on the detected amplitude offset, the value of the bit making up additional information recorded in the groove signal.

The additional information 120 is acquired based on information of the bit making up the additional information detected by the signal analysis section 202. For example, the additional information 120 is an encryption key used to decrypt encrypted content recorded on the disc 150.

On the other hand, other additional information included in the groove signal such as address information 125 is acquired as first additional information from the result of demodulation performed by the signal analysis section 202. It should be noted that an amplitude offset set in a groove signal is very slight as described earlier. Therefore, this offset does not affect acquired address information to such an extent that an error may occur. It should be noted that other additional information included in the groove signal such as the address information 125 is acquired as an ordinary groove signal reading process. For example, a push-pull signal acquired as a signal read from the groove signal is FM-demodulated, and the demodulation result is band-pass filtered and binarized. Further, the resultant signal is subjected to ECC decoding, deinterleaving or other process as necessary. As a result, other additional information included in the groove signal is acquired including the address information 125 and basic information of the disc (e.g., disc type and write strategy parameters).

It should be noted that, during reading of content recorded on data tracks, the pickup is placed at a predetermined track position, for example, using address information in the data area so as to read encrypted content. The decryption section 204 decrypts encrypted content using the additional information (encryption key) 120 acquired from the groove signal, thus reproducing the content.

A description will be given of the detailed configuration of and process performed by the signal analysis section 202 with reference to FIG. 6.

Figure 6:
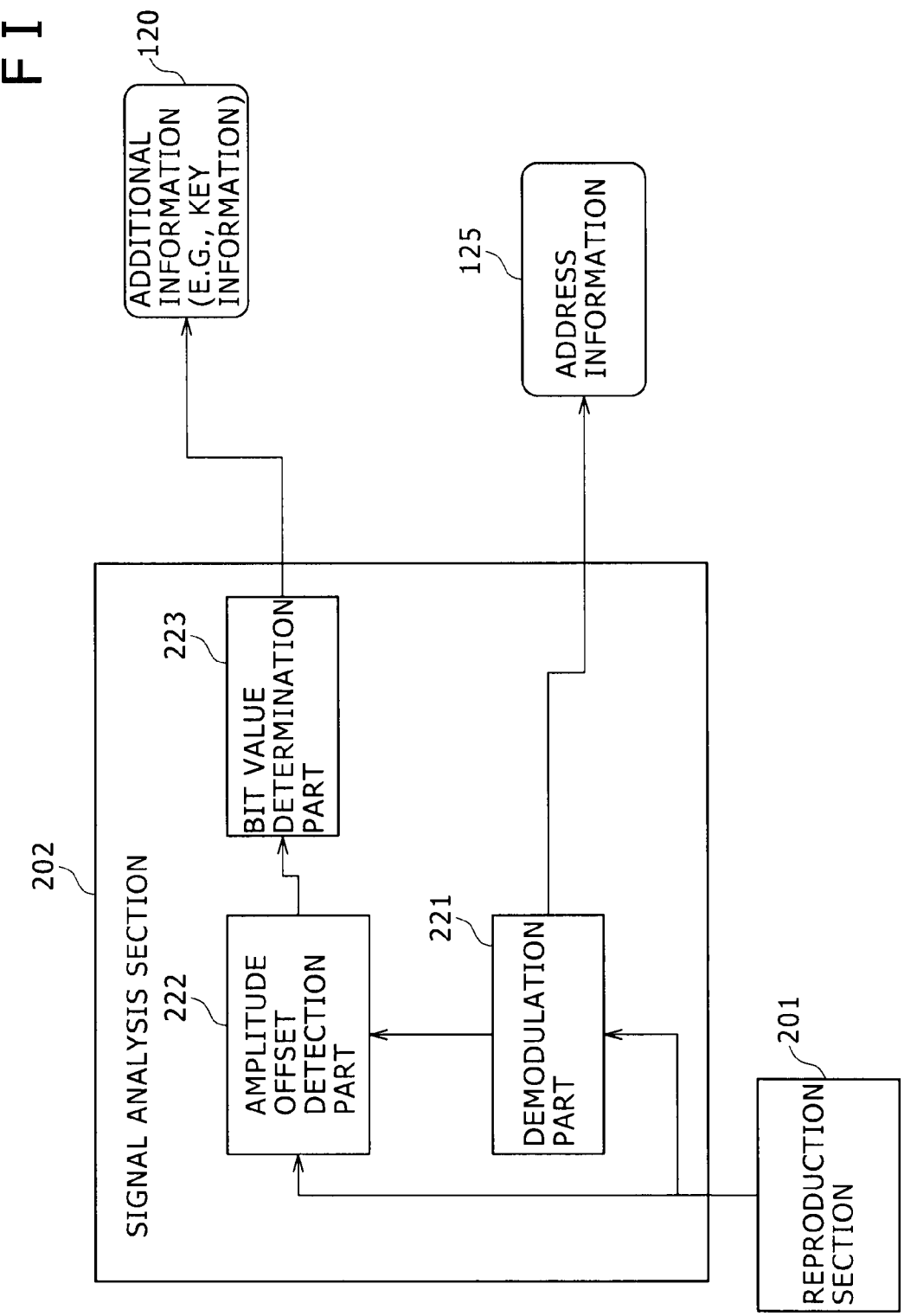
FIG. 6 is a diagram describing a detailed configuration example of a signal analysis section of the information reproducer according to the embodiment of the present invention.

The signal analysis section 202 includes a demodulation part 221, amplitude offset detection part 222 and bit value determination part 223 as illustrated in FIG. 6.

The demodulation part 221 receives the groove signal recorded on the disc as an FM-modulated signal from the reproduction section 201 so as to demodulate this signal.

The amplitude offset detection part 222 reads the groove signal at intervals of the predetermined sampling time (T) as described earlier with reference to FIG. 4, estimating the original reproduced groove signal [R0] with no offset setting from the reproduced signal [R1] read at each sampling time.

Further, the same part 222 calculates the difference signal C, i.e., C=R1−R0, representing the difference between the reproduced signal [R1] read at each sampling time and the original reproduced signal [R0] with no offset setting that has been estimated.

Still further, the same part 222 accumulates (integrates) the value of the calculated difference signal C for each constant period (e.g., t1 to t2), thus acquiring the direction of an offset (shift information). This integration determines the direction (positive or negative) of the amplitude offset of the groove signal read for each constant period (e.g., t1 to t2).

As described with reference to FIG. 3, the following signals in three different patterns are recorded on the disc:

(1) Groove signal with no amplitude offset setting
(2a) Groove signal with a positive amplitude offset setting
(2b) Groove signal with a negative amplitude offset setting The amplitude offset detection part 222 of the information reproducer determines which of the above three patterns of offset settings matches the groove signal, for example, for a constant period such as the period from t1 to t2 or from t2 to t3 shown in FIG. 4.

A description will be given below of a specific example of the detection of an amplitude offset performed by the amplitude offset detection part 222 with reference to FIG. 7 onwards.

Figure 7:
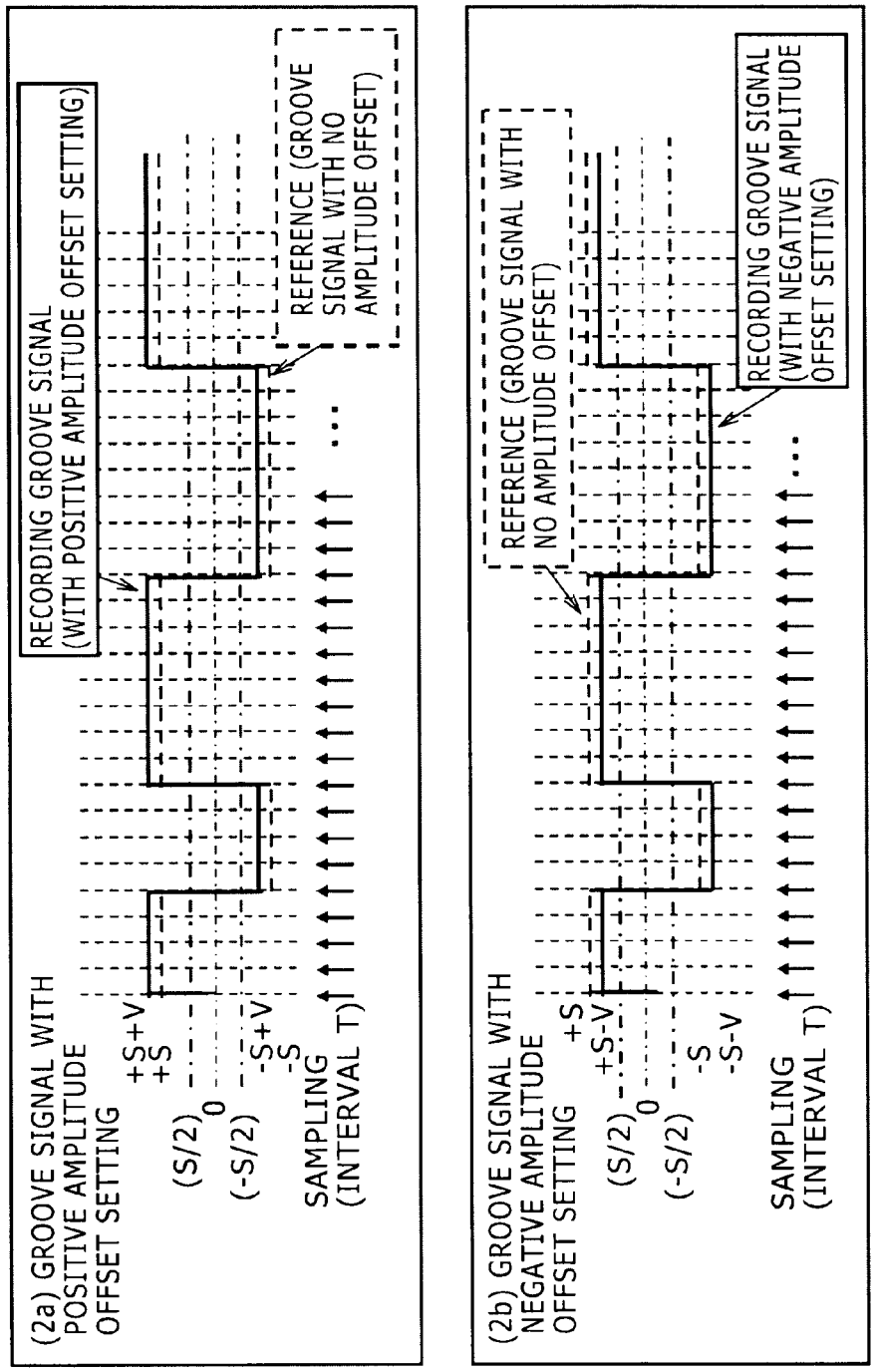
FIG. 7 shows diagrams describing examples of acquisition of additional information by analysis of a groove signal performed by the information reproducer according to the embodiment of the present invention.

FIG. 7(2a) illustrates an example of a groove signal similar to that described earlier with reference to FIG. 3(2a). A groove signal having a positive amplitude offset setting is shown by a solid line. A dashed line shows a groove signal with no amplitude offset for reference purposes.

FIG. 7(2b) illustrates an example of a groove signal similar to that described earlier with reference to FIG. 3(2b). A groove signal having a negative amplitude offset setting is shown by a solid line. A dashed line shows a groove signal with no amplitude offset for reference purposes.

The reproducer reads the groove signal at intervals of a constant sampling time. A plurality of upward arrows shown in FIGS. 7(2a) and 7(2b) represent the sampling timings. The groove signal is read every interval T from left to right.

The data sampled for a constant period (constant period such as the period from t1 to t2 or from t2 to t3 described earlier with reference to FIG. 4) is used to detect the amplitude offset.

First, the amplitude offset detection part 222 of the reproducer estimates the original reproduced signal [R0] with no offset setting from the reproduced signal [R1] read at each sampling time.

A description will be given of this estimation of the original signal with reference to the flowchart shown in FIG. 8.

First, in step S101, the reproduced groove signal [R1] is acquired.

Next, in step S102, the reproduced signal [R1] is compared against a preset threshold (S/2).

The preset threshold (S/2) will be described with reference to FIG. 7. As illustrated in FIGS. 7(2a) and 7(2b), the amplitude of the original groove signal with no offset setting ranges from −S to +S. This is the same as described earlier with reference to FIG. 3.

A groove signal with no amplitude offset is recorded as a signal having an amplitude ranging from −S to +S.

A groove signal having a positive amplitude offset setting is recorded as a signal having an amplitude ranging from (−S+V) to (+S+V).

A groove signal having a negative amplitude offset setting is recorded as a signal having an amplitude ranging from (−S−V) to (+S−V).

This is the same as described earlier with reference to FIG. 3.

"(S/2)" corresponds to half (½) the value (potential) of the positive amplitude peak (S) of the original groove signal with no offset setting.

In step S102, the reproduced groove signal [R1] is compared against [S/2] which is ½ the maximum value of the amplitude [S] of the original groove signal with no offset setting. That is, $$R1 \geq (S/2) \tag{Equation 1}$$

It is determined whether the above equation (Equation 1) holds.

When the above equation (Equation 1) holds, the process proceeds to step S104. If the equation does not hold, the process proceeds to step S103.

When the process proceeds to step S104 because the above equation (Equation 1) holds, it is determined that the original signal [R0] with no offset setting is R0=S.

If the process proceeds to step S103 because the above equation (Equation 1) does not hold, the reproduced groove signal [R1] is compared against [−S/2] which is ½ the negative amplitude peak of the original groove signal with no offset setting. That is, $$R1 \leq (-S/2) \quad \text{(Equation 2)}$$

It is determined whether the above equation (Equation 2) holds.

When the above equation (Equation 2) holds, the process proceeds to step S105. If the equation does not hold, the process proceeds to step S106.

When the process proceeds to step S105 because the above equation (Equation 2) holds, it is determined that the original reproduced signal [R0] with no offset is R0=−S.

If the process proceeds to step S106 because the above equation (Equation 2) does not hold, it is determined that the original reproduced signal [R0] with no offset is R0=R1.

A description will be given of a specific example of this estimation of an original signal with reference to FIGS. 9 and 10.

Figure 9:
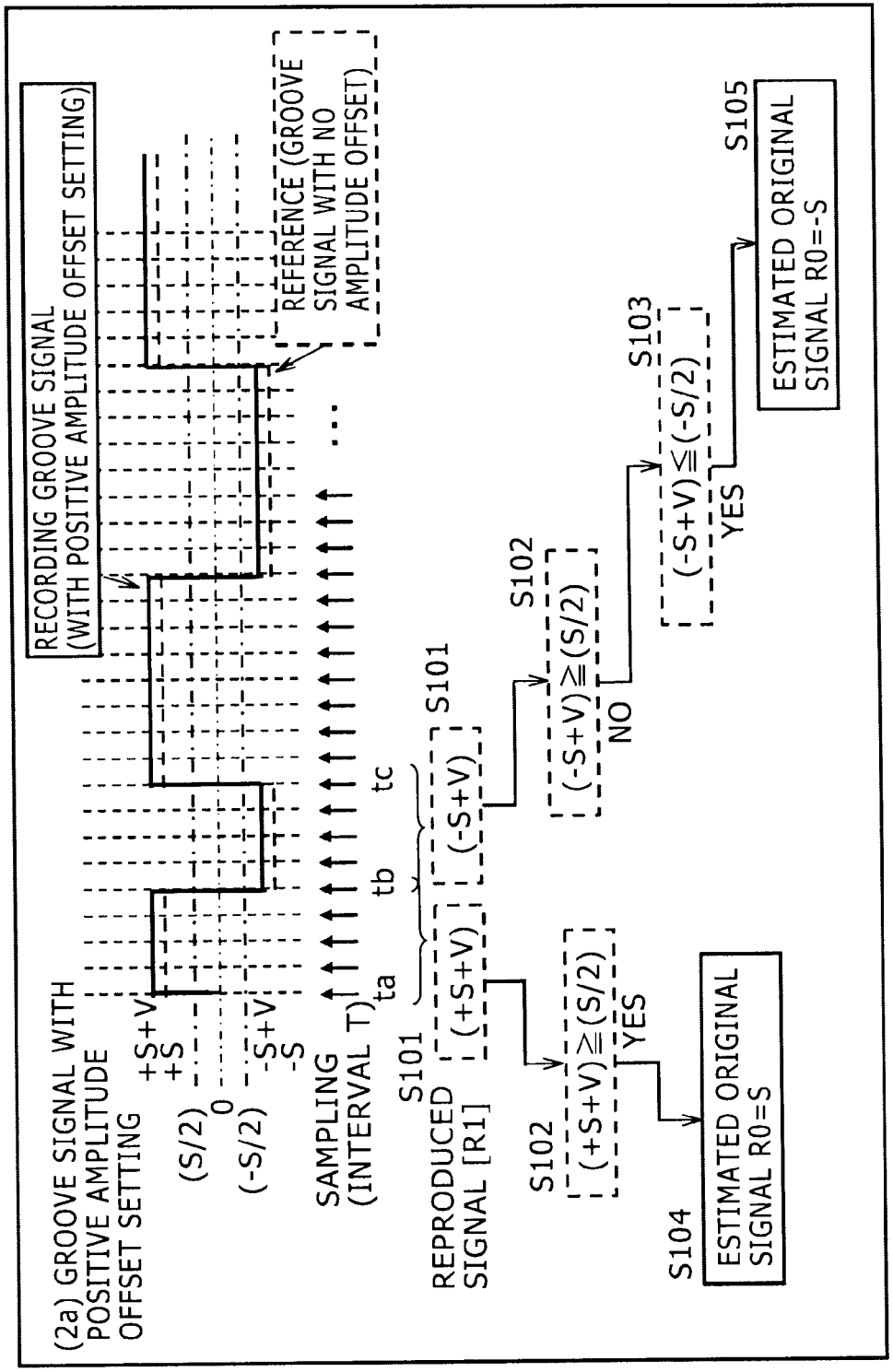
FIG. 9 is a diagram describing a specific example of estimation of an original signal with no offset from a reproduced groove signal performed by the information reproducer according to the embodiment of the present invention.

FIG. 9 is a diagram describing an example of estimation of the original signal when the groove signal having a positive amplitude offset setting shown in FIG. 7(2a) is reproduced.

The reproduced signal [R1]=(+S+V) is acquired during a signal period from ta to tb shown in FIG. 9. This corresponds to the process in step S101 shown in FIG. 8.

In step S102, the reproduced groove signal [R1]=(+S+V) is compared against [S/2] which is ½ the maximum value of the amplitude [S] of the original groove signal with no offset setting. That is, it is determined whether the following equation holds:

$$(+S+V) \geq (S/2)$$

During the period from ta to tb shown in FIG. 9, (+S+V) is obviously larger than (S/2). As a result, the above equation holds.

Figure 8:
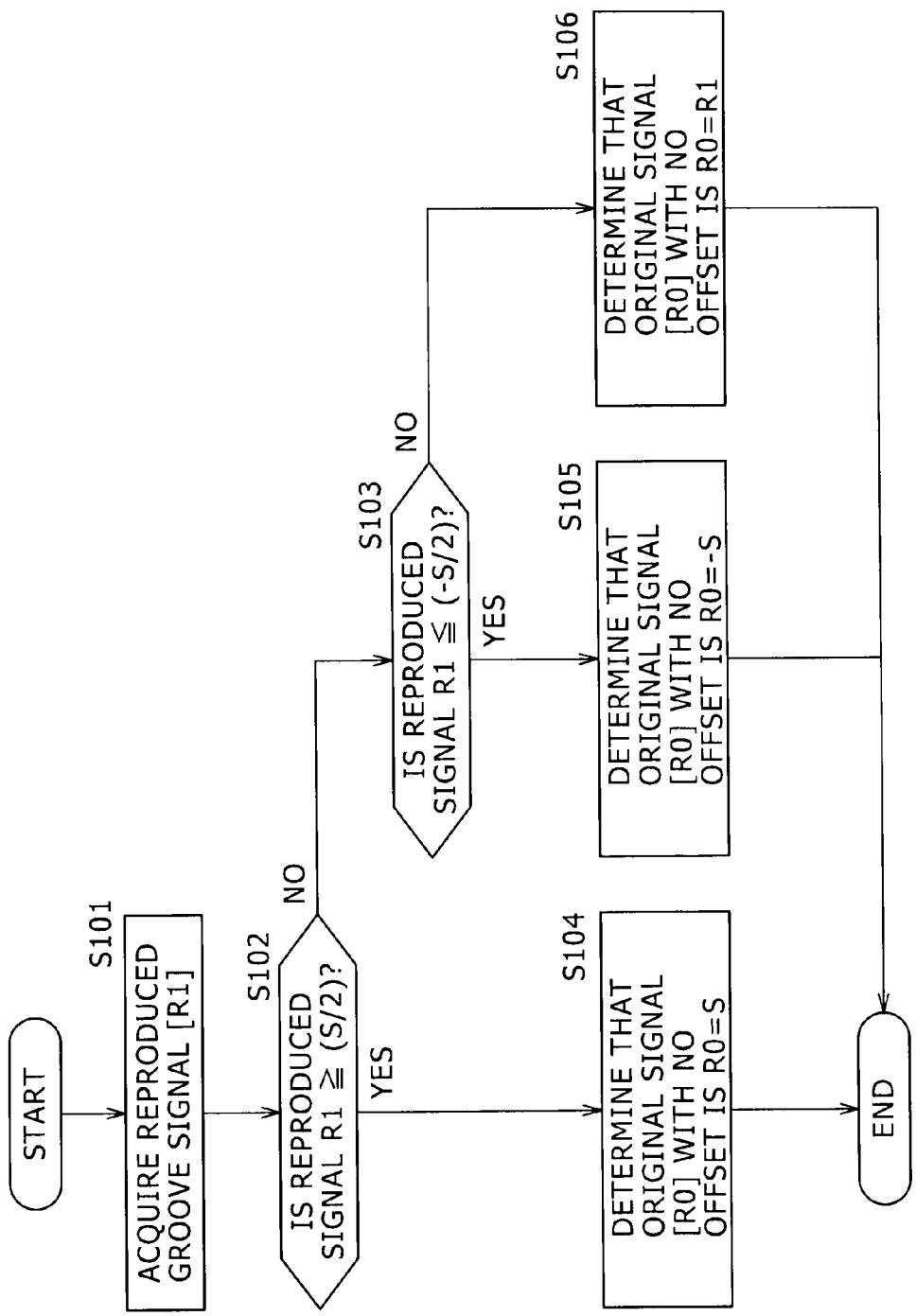
FIG. 8 is a diagram illustrating a flowchart describing a sequence for estimation of an original signal with no offset from a reproduced groove signal performed by the information reproducer according to the embodiment of the present invention.

Therefore, the determination in step S102 is "Yes." As a consequence, the process proceeds to step S104 in the flowchart shown in FIG. 8.

As a result, it is determined that the original signal [R0] with no offset is R0=S.

The reproduced signal [R1]=(−S+V) is acquired during a signal period from tb to tc shown in FIG. 9. This corresponds to the process in step S101 shown in FIG. 8.

In step S102, the reproduced groove signal [R1]=(−S+V) is compared against [S/2] which is ½ the maximum value of the amplitude [S] of the original groove signal with no offset setting. That is, it is determined whether the following equation holds:

$$(-S+V) \geq (S/2)$$

During the period from tb to tc shown in FIG. 9, (−S+V) is obviously smaller than (S/2). As a result, the above equation does not hold.

Therefore, the determination in step S102 is "No." As a consequence, the process proceeds to step S103 in the flowchart shown in FIG. 8.

In step S103, the reproduced groove signal [R1]=(−S+V) is compared against [−S/2] which is ½ the minimum value of the amplitude [−S] of the original groove signal with no offset setting. That is, it is determined whether the following equation holds:

$$(-S+V) \leq (-S/2)$$

During the period from tb to tc shown in FIG. 9, (−S+V) is obviously smaller than (−S/2). As a result, the above equation holds.

Therefore, the determination in step S103 is "Yes." As a consequence, the process proceeds to step S105 in the flowchart shown in FIG. 8.

As a result, it is determined that the original reproduced signal [R0] with no offset is R0=−S.

A description will be given next of an example of estimation of the original signal when the groove signal having a negative amplitude offset setting shown in FIG. 7(2b) is reproduced with reference to FIG. 10.

Figure 10:
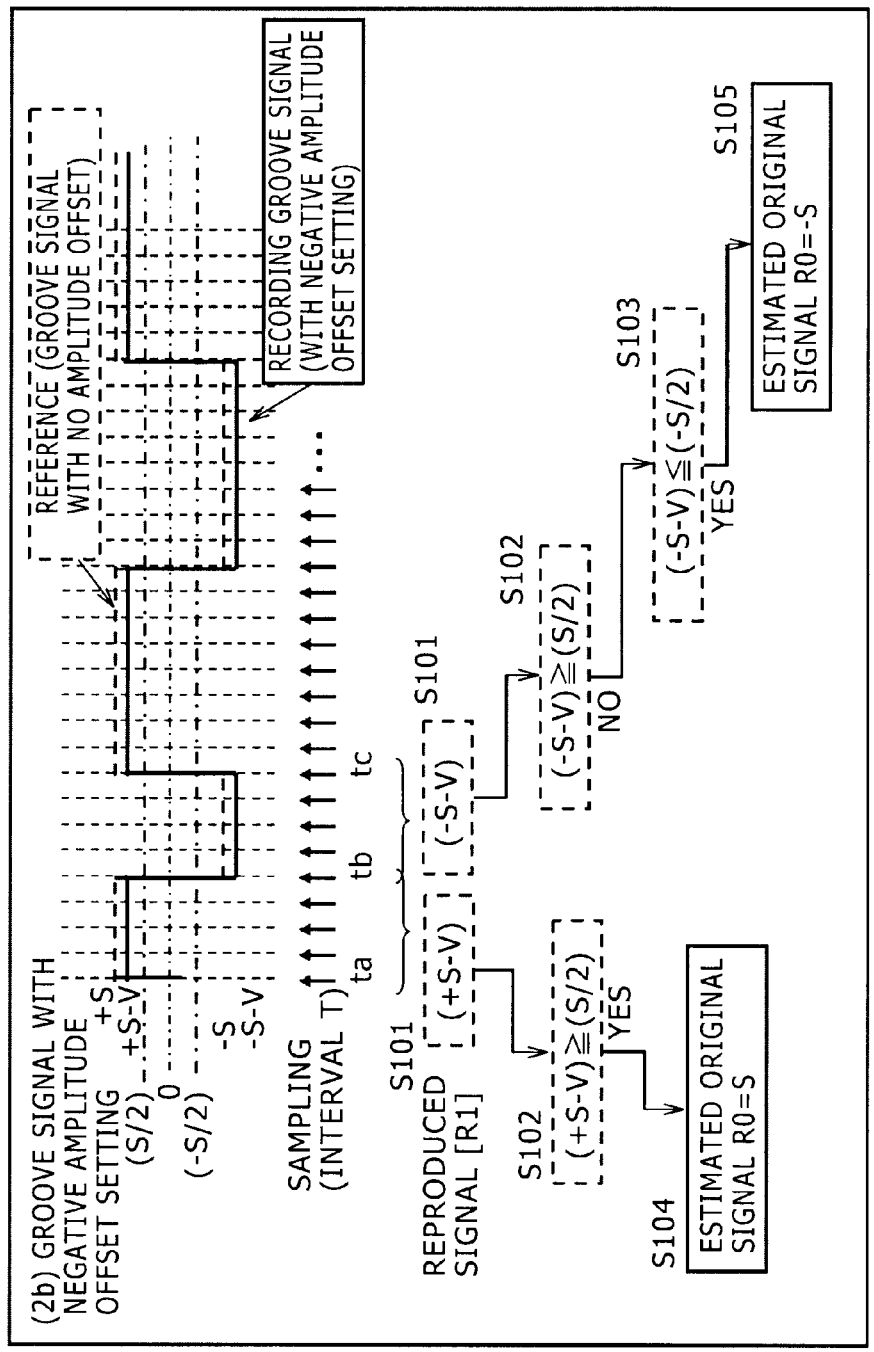
FIG. 10 is a diagram describing a specific example of estimation of an original signal with no offset from a reproduced groove signal performed by the information reproducer according to the embodiment of the present invention.

The reproduced signal [R1]=(+S−V) is acquired during the signal period from ta to tb shown in FIG. 10. This corresponds to the process in step S101 shown in FIG. 8.

In step S102, the reproduced groove signal [R1]=(+S−V) is compared against [S/2] which is ½ the maximum value of the amplitude [S] of the original groove signal with no offset setting. That is, it is determined whether the following equation holds:

$$(+S-V) \geq (S/2)$$

During the period from ta to tb shown in FIG. 10, (+S−V) is obviously larger than (S/2). As a result, the above equation holds.

Therefore, the determination in step S102 is "Yes." As a consequence, the process proceeds to step S104 in the flowchart shown in FIG. 8.

As a result, it is determined that the original reproduced signal [R0] with no offset is R0=S.

The reproduced signal [R1]=(−S−V) is acquired during the signal period from tb to tc shown in FIG. 10. This corresponds to the process in step S101 shown in FIG. 8.

In step S102, the reproduced groove signal [R1]=(−S−V) is compared against [S/2] which is ½ the maximum value of the amplitude [S] of the original groove signal with no offset setting. That is, it is determined whether the following equation holds:

$$(-S-V) \geq (S/2)$$

During the period from tb to tc shown in FIG. 10, (−S−V) is obviously smaller than (S/2). As a result, the above equation does not hold.

Therefore, the determination in step S102 is "No." As a consequence, the process proceeds to step S103 in the flowchart shown in FIG. 8.

In step S103, the reproduced groove signal [R1]=(−S−V) is compared against [−S/2] which is ½ the minimum value of the amplitude [−S] of the original groove signal with no offset setting. That is, it is determined whether the following equation holds:

$$(-S-V) \leq (-S/2)$$

During the period from ztb to tc shown in FIG. 9, (−S−V) is obviously smaller than (−S/2). As a result, the above equation holds.

Therefore, the determination in step S103 is "Yes." As a consequence, the process proceeds to step S105 in the flowchart shown in FIG. 8.

As a result, it is determined that the original signal [R0] with no offset is R0=−S.

It should be noted that step S106 in the flowchart shown in FIG. 8 represents a case in which it is determined that R0=R1. This is likely to occur when the read signal [R1] makes a positive-to-negative or negative-to-positive transition such as at time tb shown in FIGS. 9 and 10. In this case, the original reproduced signal [R0] is read and estimated as the read reproduced signal [R1].

The amplitude offset detection part 222 of the reproducer estimates the original reproduced signal [R0] with no offset setting from the reproduced signal [R1] read at each sampling time according to the flowchart shown in FIG. 8 as described above.

Next, the amplitude offset detection part 222 of the reproducer calculates the difference signal C, i.e., C=R1−R0, representing the difference between the reproduced signal [R1] read at each sampling time and the original reproduced signal [R0] with no offset setting that has been estimated.

This difference signal C is acquired one after another at each sampling time. However, this signal is 1 to 5% or so of the amplitude (−S to +S) of the FM signal serving as a groove signal. Therefore, it is difficult to determine the offset direction with high accuracy based only on the difference C calculated at each sampling time. There is a likelihood that the offset direction may be determined erroneously depending on noise present during recording or reproduction of the signal.

For this reason, the amplitude offset detection part 222 of the reproducer accumulates (integrates) the value of the difference signal C calculated at each sampling time for each constant period (e.g., t1 to t2), thus acquiring the offset direction. This integration is used to determine the direction (positive or negative) of the amplitude offset of the groove signal read for each constant period (e.g., t1 to t2).

A description will be given below of the determination of the amplitude offset performed by the amplitude offset detection part 222 of the reproducer with reference to the flowchart shown in FIG. 11.

First, in step S201, the reproduced signal=R1 is acquired. This is a reproduced groove signal recorded on a disc.

Next, in step S202, the original signal [R0] is estimated from the reproduced signal [R1]. This process was described earlier with reference to the flowchart shown in FIG. 8.

Next, in step S203, the difference signal C between the reproduced signal [R1] and estimated original signal [R0] is calculated by the following equation:

$$C = R1 - R0$$

The processes up to this point from step S201 to step S203 are performed on each piece of data read at each sampling time.

The processes from step S204 onwards are performed for each predetermined constant period (e.g., constant period such as the period from t1 to t2 or from t2 to t3 described earlier with reference to FIG. 4).

In step S204, it is assumed that the difference signal C at each sampling t for the predetermined constant period is C=I(t).

Further, in step S205, an integral Vn of C=I(t) for each predetermined period is calculated by the following equation (Equation 3):

$$Vn = \Sigma I(t) \quad \text{(Equation 3)}$$

It should be noted that 'n' in the above equation (Equation 3) denotes the number of the bit making up additional information (e.g., encryption key) which is equal to 0, 1, 2 and so on.

'Vn' denotes the accumulated (integrated) data of the read signal I(t) during the period in which the nth bit making up additional information is detected.

In step S206, the integral Vn calculated in step S205 is compared against preset thresholds T1 and T2. As a result, the following results are acquired:

$$Th1 > \Sigma I(t) > Th2 \rightarrow \text{No amplitude offset}$$

$$\Sigma I(t) \geq Th1 \rightarrow \text{Positive amplitude offset}$$

$$\Sigma I(t) \leq Th2 \rightarrow \text{Negative amplitude offset}$$

The amplitude offset detection part 222 shown in FIG. 6 acquires the accumulated (integrated) data Vn of the above difference data C=I(t) for each constant signal period (e.g., constant period such as the period from t1 to t2 or from t2 to t3 described earlier with reference to FIG. 4), outputting the acquired data to the bit value determination part 223.

The bit value determination part 223 receives amplitude offset information of the following determination equations used in step S206 shown in FIG. 11 from the amplitude offset detection part 222, determining the bit value of the additional information based on the received information:

$$Th1 > \Sigma I(t) > Th2 \rightarrow \text{No amplitude offset}$$

$$\Sigma I(t) \geq Th1 \rightarrow \text{Positive amplitude offset}$$

$$\Sigma I(t) \leq Th2 \rightarrow \text{Negative amplitude offset}$$

This process is performed for each constant signal period (e.g., constant period such as the period from t1 to t2 or from t2 to t3 described earlier with reference to FIG. 4).

The bit value determination part 223 determines the bit value for each signal period according to the information on the association between the preset amplitude offsets and bit value. For example, the bit value is determined as follows:

$$\Sigma I(t) \geq Th1 \rightarrow \text{Positive amplitude offset=Bit value of [1]}$$

$$\Sigma I(t) \leq Th2 \rightarrow \text{Negative amplitude offset=Bit value of [0]}$$

The above described bit value determination process is performed for each constant signal period. An n-bit bit string is generated based on the determination results for n signal periods. This bit information is output as the additional information (e.g., key information) 120 shown in FIG. 6.

The additional information 120 is, for example, an encryption key used to encrypt content to be stored on a disc or decrypt encrypted content stored on the disc. The decryption section 204 shown in FIG. 5 decrypts encrypted content using the additional information (encryption key) 120 acquired from the groove signal, thus reproducing the content.

FIG. 12 shows diagrams describing specific examples of comparison between the integration result ($\Sigma I(t)$) of the difference signal acquired at each sampling time t, i.e., I(t)=C (=R1−R0), and the thresholds.

FIG. 12 illustrates the following signals in three different patterns:
(1) Groove signal with no amplitude offset setting
(2a) Groove signal with a positive amplitude offset setting
(2b) Groove signal with a negative amplitude offset setting The curves shown in FIGS. 12(1) to 12(2b) are the integration results Vn of the difference signal C=I(t) for the signal period from t1 to t2 respectively when the signals have the above three patterns.

FIG. 12(1) illustrates an example in which the groove signal has no amplitude offset setting for the signal period from t1 to t2.

In this case, the difference signal C=I(t) is generated in a roughly balanced manner between the positive and negative directions so as to fit within the error range of the signal with no bias on one side.

As a result, the integration result of the difference signal C=I(t) for the signal period from t1 to t2, i.e., Vn=ΣI(t), fits within the range between the present thresholds Th1 and Th2.

That is, this means that because Th1>ΣI(t)>Th2, the groove signal has no amplitude offset.

As described above, it is determined according to the above equation that this signal has no amplitude offset.

FIG. 12(2a) illustrates an example in which the groove signal has a positive amplitude offset setting for the signal period from t1 to t2. This corresponds to the example described with reference to FIG. 7(2a).

In this case, the difference signal C=I(t) is generated with a positive bias.

As a result, the integration result of the difference signal C=I(t) for the signal period from t1 to t2, i.e., Vn=ΣI(t), exceeds the preset threshold Th1.

That is, this means that because ΣI(t)≥Th1, the groove signal has a positive amplitude offset and the bit value is [1].

As described above, it is determined according to the above equation that this signal has a positive amplitude offset, and that the bit value is [1].

FIG. 12(2b) illustrates an example in which the groove signal has a negative amplitude offset setting for the signal period from t1 to t2. This corresponds to the example described with reference to FIG. 7(2b).

In this case, the difference signal C=I(t) is generated with a negative bias.

As a result, the integration result of the difference signal C=I(t) for the signal period from t1 to t2, i.e., Vn=ΣI(t), falls below the preset threshold Th2.

That is, this means that because ΣI(t)≤Th2, the groove signal has a negative amplitude offset and the bit value is [0].

As described above, it is determined according to the above equation that this signal has a negative amplitude offset, and that the bit value is [0].

As described above, the comparison of the integration result (Vn=ΣI(t)) of the difference signal C=I(t) against the thresholds makes it possible to determine which of the three patterns matches the groove signal. That is, it is possible to determine whether the signal has any amplitude offset, and if so, in which direction, according to the following determination equations:

$$Th1 > \Sigma I(t) > Th2 \rightarrow \text{No amplitude offset}$$

$$\Sigma I(t) \geq Th1 \rightarrow \text{Positive amplitude offset=bit value of [1]}$$

$$\Sigma I(t) \leq Th2 \rightarrow \text{Negative amplitude offset=bit value of [0]}$$

3. Configuration of and Process Performed by the Information Recorder

If additional information superimposed on a groove signal is, for example, an encryption key, the user's information recorder/reproducer can read the groove signal recorded on the inserted disc and acquire the encryption key. Further, content acquired from a server can be encrypted using the acquired encryption key and recorded to a disc.

Alternatively, it is possible for a server to supply encrypted content using the same encryption key as that recorded on the disc to the user device and for the user device to record the encrypted content to the disc so that, during later reproduction, the content can be decrypted and reproduced using the encryption key acquired from the groove signal recorded on the disc.

A description will be given of examples of the configuration and process performed by an information recorder adapted to record encrypted content to a disc on which a groove signal superimposed with an encryption key is recorded with reference to FIG. 13.

FIG. 13 is a block diagram illustrating a configuration example of an information recorder 300 serving as a user device adapted to record encrypted content to the above disc 150, i.e., the disc 150 on which an encryption key is recorded in a groove signal as additional information when the disc 150 is inserted in the same recorder 300.

The information recorder 300 includes a recording/reproduction section 301, signal analysis section 302, encryption section 304 and communication section 305 as illustrated in FIG. 13.

The recording/reproduction section 301 reads a groove signal and recorded content from the disc 150 and further records content.

The signal analysis section 302 has a configuration similar to that of the signal analysis section 202 of the information reproducer 200 described earlier with reference to FIGS. 5 and 6, performing similar processes. That is, the same section 302 demodulates and analyzes a groove signal fed from the recording/reproduction section 301, detecting the amplitude offset and detecting, based on the detected amplitude offset, the value of the bit making up the additional information recorded in the groove signal.

The additional information 120 is acquired using the information of the bit making up the additional information detected by the signal analysis section 302. For example, the additional information 120 is an encryption key used to encrypt content to be recorded to the disc 150. The additional information 120 is also used to decrypt encrypted content recorded on the disc 150.

Further, the address information 125, i.e., other additional information included in the groove signal, is acquired from the result of demodulation performed by the signal analysis section 302. The address information 125 is used to record data to the disc 150 or reproduce data therefrom.

The information recorder 300 communicates with a content server 400 via the communication section 305, acquiring content from the content server 400. The acquired content is either encrypted content or unencrypted plain text content.

If the acquired content is encrypted content, the encrypted content can be decrypted using the encryption key that can be read from the groove signal recorded on the disc 150. If such encrypted content is received from the server, the received encrypted content is recorded to the disc 150 via the recording/reproduction section 301.

On the other hand, if unencrypted plain text content is received from the content server 400, the encryption section 304 encrypts the plain text content using the encryption key read from the groove signal recorded on the disc 150 as the additional information 120. As a result, the generated encrypted content is recorded to the disc 150 via the recording/reproduction section 301.

If encrypted content recorded on the disc 150 is reproduced, the encrypted content is read from the disc 150, and the encryption key is read from the groove signal, thus decrypting the encrypted content using the read encryption key for reproduction. This process is similar to that performed by the information reproducer 200 described with reference to FIG. 5.

It should be noted that although, in the configuration shown in FIG. 13, content to be recorded to the disc is acquired from the content server 400 via the communication section 305, the source of content is not limited to the server. Instead, a variety of sources may be set up including broadcasting, other information processors and other media. It is possible to record content, fed via an interface serving as a content input section commensurate with these sources, to the disc as encrypted content.

If encrypted content is recorded to the disc by the information recorder 300 shown in FIG. 13, the encrypted content and the encryption key used to decrypt the encrypted content are stored together on a single disc. Therefore, even if the encrypted content is, for example, output and copied to other media, the encryption key cannot be used. This effectively prevents unauthorized use of the content.

4. Other Embodiments

For recording of a groove signal superimposed with additional information, an amplitude offset commensurate with the bit value can be set not only using the configuration described earlier with reference to FIG. 4 but also in various other manners.

In the example described with reference to FIG. 4, when the bit is '1,' a groove signal having a positive amplitude offset setting is recorded. When the bit is '0,' a groove signal having a negative amplitude offset setting is recorded. The bit value is determined based on these amplitude offset settings.

The association between the bit value and amplitude offset can be set in a variety of manners. The association therebetween can be set in a manner opposite to the above. Alternatively, the bit value can be associated with a plurality of amplitude offset patterns. FIG. 14 illustrates an example thereof.

FIG. 14 is a diagram illustrating examples of recording and reproduction of a groove signal as is FIG. 4 described earlier. FIG. 14 illustrates an example in which a groove signal is recorded by combining two groove signals having different offset settings. That is, when the bit is '1,' a preceding groove signal having a positive amplitude offset setting is combined with a succeeding groove signal having a negative amplitude offset setting. When the bit is '0,' a preceding groove signal having a negative amplitude offset setting is combined with a succeeding groove signal having a positive amplitude offset setting.

In the example shown in FIG. 14, the following examples of settings are shown:

t1 to t2: Groove signal having a positive amplitude offset setting t2 to t3: Groove signal having a negative amplitude offset setting The bit value of '1' is represented by these groove signals recorded for a period from t1 to t3.

t3 to t4: Groove signal having a negative amplitude offset setting t4 to t5: Groove signal having a positive amplitude offset setting The bit value of '0' is represented by these groove signals recorded for a period from t3 to t5.

As illustrated at the top in FIG. 14, when a groove signal is recorded, the groove signals having the above offset settings are generated and recorded depending on whether the value of the bit making up additional information is '1' or '0.'

For reproduction, the reproducer reads the groove signal at intervals of a predetermined sampling time (T), estimating the original signal [R0] with no offset setting from the reproduced signal [R1] read at each sampling time for each constant period such as the period from t1 to t2 or from t2 to t3.

Next, the reproducer calculates the difference signal C, i.e., C=R1−R0, representing the difference between the reproduced signal [R1] and the estimated original signal [R0].

Further, the reproducer accumulates (integrates) the value of the calculated difference signal C for a constant period (e.g., t1 to t2). The reproducer determines whether the result of accumulation deviates positively or negatively by a predetermined threshold or more, thus determining the offset direction for each period.

Further, the reproducer determines the bit value of the additional information based on the result of determination on the offset direction for a plurality of predetermined periods (e.g., t1 to t2 and t2 to t3).

For example, the reproducer performs the following processes:

t1 to t2: The reproducer estimates the original signal [R0] with no offset setting from the reproduced signal R1, i.e., the read groove signal, and then calculates the difference signal C=R1−R0. The reproducer accumulates (integrates) the value of the calculated difference signal C, determining that a positive amplitude offset is set during this period.

t2 to t3: The reproducer estimates the original signal [R0] with no offset setting from the reproduced signal R1, i.e., the read groove signal, and then calculates the difference signal C=R1−R0. The reproducer accumulates (integrates) the value of the calculated difference signal C, determining that a negative amplitude offset is set during this period.

For the period from t1 to t3, the reproducer determines that the bit value is '1' based on the fact that a combination of a preceding groove signal having a positive amplitude offset setting and a preceding signal having a negative amplitude offset setting has been detected.

Next, t3 to t4: The reproducer estimates the original signal [R0] with no offset setting from the reproduced signal R1, i.e., the read groove signal, and then calculates the difference signal C=R1−R0. The reproducer accumulates (integrates) the value of the calculated difference signal C, determining that a negative amplitude offset is set during this period and that the bit value is '1.' t4 to t5: The reproducer estimates the original signal [R0] with no offset setting from the reproduced signal R1, i.e., the read groove signal, and then calculates the difference signal C=R1−R0. The reproducer accumulates (integrates) the value of the calculated difference signal C, determining that a positive amplitude offset is set during this period and that the bit value is '1.'

For the period from t3 to t5, the reproducer determines that the bit value is '0' based on the fact that a combination of a preceding groove signal having a negative amplitude offset setting and a preceding signal having a positive amplitude offset setting has been detected.

Performing the processes as described above makes it possible to obtain all the values of the bits making up, for example, a 64-bit or 128-bit key.

It should be noted that it may become impossible to distinguish between preceding and succeeding groove signal periods if the direction of the amplitude offset is set, for example, in the following order: [positive], [negative], [positive], [negative], [positive] and [negative]. However, this problem can be resolved, for example, by using a signal period with no amplitude offset setting. For example, groove signals having the following settings are recorded by assuming a signal period with no amplitude offset setting to be '0':

[positive], [negative], [0], [positive], [negative], [0], [positive], [negative], [0], [negative], [positive]

The above signals are recorded with [0] used as a delimiting signal.

This setting makes it possible to determine whether the preceding signal of a pair of groove signals, one having a positive amplitude offset and another having a negative amplitude offset, has a positive or negative amplitude offset. In the above case, it is possible to determine that the bit string is '1110' and so on.

It should be noted that the example shown in FIG. 14 has been described as a configuration adapted to identify the bit value (0 or 1) using an arrangement of two types of groove signals, one having a positive amplitude offset setting and another having a negative amplitude offset setting. In addition to the above, however, various other settings are also possible including the following: [positive], [positive], [negative] . . . Bit value of 1 [negative], [negative], [positive] . . . Bit value of 0

Among still other possible configurations is that adapted to use a clock signal (RT: Reference Timing Signal) whose value changes (between +1 and −1) every signal period (e.g., t1 to t2 and t2 to t3 shown, for example, in FIG. 4). In this configuration, the multiplication of the clock signal RT and the above difference signal C is accomplished by the following equation:

$$C \times RT$$

Further, the value calculated by the above equation is integrated for each signal period.

$$I(t) = C \times RT$$

Then, the integral is compared against predetermined thresholds to determine the offset direction.

A detailed description has been given above of the present invention with reference to the specific execution example. However, it is apparent that those skilled in the art can modify or substitute the embodiment without departing from the scope of the present invention. That is, the present invention has been disclosed in an illustrative manner and should not be interpreted restrictively. The appended claims should be considered to understand the gist of the present invention.

Further, the series of processes described in the present specification can be performed by hardware or software or a combination of both. If the above series of processes is performed by software, the program storing the process sequence is installed to the memory of a computer incorporated in dedicated hardware or to a general-purpose personal computer capable of performing various processes. For example, the program may be recorded in advance on a recording media. In addition to installing from a recording media to a computer, the program may be received via a network such as LAN (Local Area Network) or the Internet so as to install the program to the built-in recording media such as hard disk.

It should be noted that the various processes described in the specification may be performed not only chronologically according to the description but also in parallel or individually according to the processing capability of the device performing the processes or as necessary. On the other hand, the term "system" in the present specification refers to a logical collection of a plurality of devices, and that the constituent devices are not necessarily provided in the same enclosure.

INDUSTRIAL APPLICABILITY

As described above, the configuration according to the embodiment of the present invention makes possible an information recording configuration that achieves both difficulty in reading and highly accurate reading. For example, highly confidential additional information such as encryption key is recorded in a groove signal. During recording of the additional information, a groove signal is recorded that has an amplitude offset setting commensurate with the value of the bit making up the additional information. During reading of the additional information, the signal R0 with no offset is estimated from the signal R1 read from the groove signal for a predetermined period, after which the difference signal C=R1−R0 is calculated and integrated for each of the predetermined periods so as to determine the direction of the amplitude offset for each period. This process achieves recording and reproduction of additional information that offers enhanced difficulty in reading and highly accurate reading at the same time.

EXPLANATION OF REFERENCE NUMERALS

100 Recording media manufacturing system
102 Recoding signal generation section
103 Recording section
120 Additional information
122 Modulated signal generation part
123 Amplitude offset setting part
125 Address information
130 Master disc
150 Disc
201 Reproduction section
202 Signal analysis section
204 Decryption section
221 Demodulation part
222 Amplitude offset detection part
223 Bit value determination part
301 Recording/reproduction section
302 Signal analysis section
304 Encryption section

The invention claimed is:

1. A recording media manufacturing system comprising:
   a recording signal generation section operable to generate a groove signal adapted to record additional information; and
   a recording section operable to record a recording signal, generated by the recording signal generation section, to a master disc, wherein
   the recording signal generation section determines an amplitude offset setting of the groove signal according to value of each of bits making up the additional information, wherein the amplitude offset setting refers to shifting amplitude of the groove signal relative to a pre-determined amplitude of a groove signal with no amplitude offset, and
   the recording signal generation section generates the recording signal having the amplitude offset setting commensurate with the value of each of the bits making up the additional information for each predetermined period of the recording signal.

2. The recording media manufacturing system of claim 1, wherein
   the recording signal generation section generates the recording signal having a different direction of the amplitude offset or different combination of amplitude offset directions to be set in the groove signal according to whether the bit value of the additional information is '0' or '1'.

3. The recording media manufacturing system of claim 2, wherein the direction of the amplitude offset is either an inner or an outer circumferential direction of the master disc.

4. The recording media manufacturing system of claim 1, wherein
the additional information includes an encryption key used to encrypt content to be recorded to the master disc or decrypt encrypted content recorded on the master disc.

5. The recording media manufacturing system of claim 1, wherein the recording signal generation section generates a modulated signal by modulating the groove signal according to a first additional information, wherein the modulated signal corresponds to the groove signal with no amplitude offset.

6. The recording media manufacturing system of claim 5, wherein the first additional information includes conditions for recording content on the master disc.

7. The recording media manufacturing system of claim 5, wherein the recording signal generation section generates the recording signal from the modulated signal by setting the amplitude offset in the modulated signal according to value of each of bits making up a second additional information, wherein the recording signal comprises the second additional information superimposed on the first additional information.

8. The recording media manufacturing system of claim 7, wherein the second additional information includes an encryption key used to encrypt content to be recorded to the master disc or decrypt encrypted content recorded on the master disc.

9. The recording media manufacturing system of claim 1, wherein the amplitude offset of the groove signal is set by adjusting Direct Current (DC) level of the recording signal.

10. An information recording media operable to record a groove signal used to record additional information, wherein
the groove signal is recorded as a signal having an amplitude offset setting commensurate with value of a bit making up the additional information for a predetermined signal period, wherein the amplitude offset setting refers to shifting amplitude of the groove signal relative to a pre-determined amplitude of a groove signal with no amplitude offset, and
the additional information is adapted to be read by a reproducer based on detection of the amplitude offset setting by the reproducer.

11. The information recording media of claim 10, wherein the groove signal is a signal having a different direction of the amplitude offset or different combination of amplitude offset directions set in the groove signal according to whether the bit value of the additional information is '0' or '1'.

12. The information recording media of claim 10, wherein the additional information includes an encryption key used to encrypt content to be recorded to the information recording media or decrypt encrypted content recorded on the information recording media.

13. An information recording media manufacturing method carried out by a recording media manufacturing system, the information recording media manufacturing method comprising:
generating a groove signal adapted to record additional information;
determining an amplitude offset setting of the grove signal according to value of each of bits making up the additional information, wherein the amplitude offset setting refers to shifting amplitude of the groove signal relative to a pre-determined amplitude of a groove signal with no amplitude offset;
generating a recording signal having the amplitude offset setting commensurate with the value of each of the bits making up the additional information for each predetermined period of the recording signal; and
recording the generated recording signal to a master disc.

* * * * *